US012321725B1

(12) United States Patent
Wilson et al.

(10) Patent No.: US 12,321,725 B1
(45) Date of Patent: Jun. 3, 2025

(54) SYSTEMS, DEVICES, AND METHODS FOR CREATING, DEPLOYING, AND INTEGRATING PLUGINS WITH LARGE LANGUAGE MODEL APPLICATIONS

(71) Applicant: PwC Product Sales LLC, New York, NY (US)

(72) Inventors: Jacob Thomas Wilson, Castle Pines, CO (US); Henry Hwangbo, Northbrook, IL (US); Shaz Hoda, New York, NY (US); Vinston Pandiyan, Land O' Lakes, FL (US); Sagar Mankari, Denver, CO (US)

(73) Assignee: PwC Product Sales LLC, New York, NY (US)

( * ) Notice: Subject to any disclaimer, the term of this patent is extended or adjusted under 35 U.S.C. 154(b) by 0 days.

(21) Appl. No.: 18/818,202

(22) Filed: Aug. 28, 2024

Related U.S. Application Data

(63) Continuation of application No. 18/731,995, filed on Jun. 3, 2024.

(51) Int. Cl.
*G06F 8/35* (2018.01)
(52) U.S. Cl.
CPC ..................... *G06F 8/35* (2013.01)
(58) Field of Classification Search
CPC .................... G06F 8/35; G06F 3/048
See application file for complete search history.

(56) References Cited

U.S. PATENT DOCUMENTS

| 9,678,726 | B1* | 6/2017 | Massaguer | .............. G06F 11/36 |
| 11,973,794 | B1* | 4/2024 | Levi | ....................... G06F 16/953 |
| 2005/0283446 | A1* | 12/2005 | Dettinger | ............ G06Q 30/0283 705/400 |
| 2023/0098023 | A1* | 3/2023 | Kirmse | .................... G06F 21/57 707/769 |
| 2024/0378396 | A1* | 11/2024 | Bhupati | .................. G06F 40/20 |

OTHER PUBLICATIONS

Microsoft Learn. (Dec. 2023) "Understanding AI Plugins in Semantic Kernel," located at https://learn.microsoft.com/en-us/semantic-kernel/agents/plugins/?tabs=Csharp, visited on May 30, 2024. (7 pages).

* cited by examiner

*Primary Examiner* — Hanh Thi-Minh Bui
(74) *Attorney, Agent, or Firm* — Morrison & Foerster LLP

(57) ABSTRACT

A method for creating and deploying plugins for use with one or more web-hosted large language model applications includes: displaying a user interface comprising a code template for creation of a plugin, wherein the code template comprises a context template, a native function template, and a semantic prompt template; receiving modifications to the code template via the user interface to form a modified code template, the modified code template comprising: custom context based on the context template; custom native code comprising one or more computer executable functions based on the native function template; and a custom prompt configured to prompt a large language model based on the semantic prompt template; generating a plugin based on the modified code template; and storing the plugin within a database of a plugin registry.

15 Claims, 25 Drawing Sheets

/ AI Factory-Semantic... + | / AI Factory - Semantic Kern... / Repos / Files / ◇ Sap ∨

Overview

Boards

Repos          ◇ Sap
               > □ helm-chart
Files          > □ indexer
               > □ plugin
Commits          □ .gitignore
                 □ .gitignore.bak
Pushes           M↓ README.md
Branches Tags Pull requests Advanced Security Pipelines Test Plans Artifacts Portfolio++

AI Hub

Q Search

Q Filter respositories

◇ aifactory-plugin-py-template ☆
◇ sk-csharp-chatgpt-plugin ☆
◇ ABR-aifactory-plugin-py-template
◇ adt-ado-extensions
◇ adt-build
◇ adt-codegen-plugin
◇ adt-ideate + New repository
↑ Import repository
● Manage repositories M↓ README.md          Feb 14

⊙ succeeded    Clone

Commits

523d278f Merged PR 5599: Updated value.yaml Luis E Acosta
31bbb419 Matt Melich-Updated Global Integration Fabric en...
bbfd51e8 Merged PR 6013: feature: #36372 make transcripts...
d6bcad13 Luis E Acosta - SAP indexer Luis E Acosta
d6bcad13 Luis E Acosta - SAP indexer Luis E Acosta
647d1bda (SAP) Update of README.md file Edgar Ricardo P...

Introduction
Welcome to the documentation for SAP indexer integration. This guide will help you get started with integrating SAP Indexer into your system and provide information on how to handle error scenarios.

Getting Started
To begin integrating SAP Indexer into your system, you will need to obtain a service bus connection string. Please reach out to Plugin Delivery and provide them with the details of your specific environment. They will provide you with the necessary connection string.

Topics
SAP Indexer utilizes two topics: one for requesting indexing and another for receiving indexing results.

Message request for [sap-index-request]
The message request for indexing contains the following properties:
BlobName: A string representing the name of the blob.

EXPLORER
∨ GLOBAL-DEMO
  > .vscode
  > .well-known
    {} manifest.json          O
  > helm-chart                M
  > value.yaml
  > plugins
  > utils
    🐍 __init__.py
    $ .env.example
    ⊕ .gitignore
    🐍 app.py
  / azure-pipeline.yaml
    🐳 docker-compose.yaml
    🐳 dockerfile
    🖼 logo.png
    / openapi.yaml              M
    / orchestrator_openapi.yaml M
    ≡ Pipfile
    {} Pipfile.lock
    {} Plugin_attributes.json
    ≡ poetry.lock
    🐍 poetry.toml
    ♦ pyproject.toml
    ⓘ README.md
    ≡ tests.http

> OUTLINE
> TIMELINE

{} manifest.json M | openapi.yaml M | / orchestrator_openapi.yaml M | {} Plugin_attributes.json | / azure-pipeline.yaml  ×
/ azure-pipeline.yaml > {} trigger 1  trigger:
 2    branches:
 3      include:
 4        -refs/heads/main
 5    batch: True
 6  # name: $(date:yyyyMMdd)$(rev:.r)
 7  pool:
 8    name: "genai-agent"
 9
10  variables:
11  # Please update below variables for your plugin
12    PluginName: 'py-template'
13    GitRepoName: 'aifactory-plugin-py-template'
14    DockerfilePath: './Dockerfile'
15    DockerBuildArg: '-'
16    DockerBuildContext: '.'
17    ImageName: 'plugin-python-template'
18    ServicePort: '3300'
19    ServicePrefixPath: '/service/Sample'
20    HealthCheckpath: '/service/Sample/.well-known/manifest.json'
21    CustomkeyVault: false
22    QADeploymentApproval: false
23
24  parameters:
25  - name: Activity
26    displayName: What do you want to do?
27    default: Deploy
28    type: string
29    values:
30    | Deploy
31    | veracode
32    | blackduck
33  - name: build
34    displayName: Need to build the image or not?
35    default: true
36    type: boolean
37
38  resources:
39    repositories:
40    -repository: manifests

```
Dockerfile > ⚡ FROM
 1  FROM python:3.11
 2
 3  # Configure Poetry
 4  ENV POETRY_VERSION=1.5.1
 5  ENV POETRY_HOME=/opt/poetry
 6  ENV POETRY_VENV=/opt/poetry-venv
 7  ENV POETRY_CACHE_DIR=/opt/.cache
 8
 9  # Install poetry seperated from system interpreter
10  RUN python3 -m venv $POETRY_VENV \
11      && $POETRY_VENV/bin/pip install -U pip setuptools \
12      && $POETRY_VENV/bin/pip install poetry==${POETRY_VERSION}
13
14  # Add `poetry` to PATH
15  ENV PATH="${PATH}:${POETRY_VENV}/bin"
16
17  WORKDIR /app
18
19  # Install dependencies
20  COPY poetry.lock pyproject.toml ./
21  RUN poetry install
22
23  # Run your app
24  COPY . /app
25  CMD [ "poetry", "run", "python", "app.py" ]
26
```

SYSTEMS, DEVICES, AND METHODS FOR CREATING, DEPLOYING, AND INTEGRATING PLUGINS WITH LARGE LANGUAGE MODEL APPLICATIONS

CROSS-REFERENCE TO RELATED APPLICATIONS

This application is a continuation of U.S. patent application Ser. No. 18/731,995, filed Jun. 3, 2024, the entire contents of which are incorporated here by reference.

FIELD

This disclosure relates generally to application plugins, and more specifically to creation, deployment, and integration of plugins with large language model (LLM) applications.

BACKGROUND

Existing systems that utilize AI model plugins do not provide a robust, end-to-end development pipeline for creating, deploying, and integrating plugins with LLM applications in a cloud agnostic and platform agnostic manner. As such existing systems that enable creation and utilization for plugins lack the features necessary for consistent and scalable creation and deployment of plugins usable across a variety of enterprise applications and cloud computing environments. Using known techniques, creating plugins for different platforms requires manually coding from scratch for each different platform.

SUMMARY

Disclosed herein are systems and methods for the creation, deployment, and integration of plugins with large language model applications in a scalable, cloud-agnostic manner. The systems and methods disclosed herein provide a pipeline for developers to create and deploy plugins using standardized code templates retrievable from an online repository. Developers can add their own custom code, including prompts for instructing LLMs, context/metadata, memories, connectors, and other functions to the code template. The modified code template can then be packaged, deployed, and registered as a containerized application programming interface (API) to an online registry and database. Once registered, the plugin may be discoverable to various applications (e.g., enterprise applications, web-based applications, etc.) via the plugin registry API that enables registration and discovery of plugins. Plugins discovered by applications via the plugin registry API can be connected to the application by calling the plugins. The applications may call the plugins directly without passing through the registry API. User prompts received via the applications can be processed using one or more connected plugins by executing functions included in the plugins.

According to an aspect, an exemplary method for creating and deploying plugins for use with one or more web-hosted large language model applications includes: displaying a user interface comprising a code template for creation of a plugin, wherein the code template comprises a context template, a native function template, and a semantic prompt template; receiving modifications to the code template via the user interface to form a modified code template, the modified code template comprising: custom context based on the context template; custom native code comprising one or more computer executable functions based on the native function template; and a custom prompt configured to prompt a large language model based on the semantic prompt template; generating a plugin based on the modified code template, wherein generating the plugin comprises; and storing the plugin within a database of a plugin registry.

According to an aspect, an exemplary method for connecting a plugin to an application includes: at a plugin registry: receiving, from an application, a plugin discovery request wherein the request includes an application identifier for identifying one or more plugins configured to be connected to the application; querying a database to identify one or more plugins configured to be connected to the application by matching the identifier to one or more applications stored in the database based on an indication of a compatible application associated with the plugin; transmitting, to the application, an indication of one or more plugins configured to be connected to the application in response to the discovery request; receiving a selection of at least one plugin of the one or more plugins configured to be connected to the application; connecting the selected plugin to the application; at the application: receiving a user input via a user interface of the application; processing the user input using the plugin, wherein processing the user input comprises selecting one or more functions of the plugin to execute based on the input; executing the one or more functions to generate an output.

According to an aspect, an exemplary method for creating and deploying plugins for use with one or more web-hosted large language model applications includes: displaying a user interface comprising a code template for creation of a plugin, wherein the code template comprises a context template, a native function template, and a semantic prompt template; receiving modifications to the code template via the user interface to form a modified code template, the modified code template comprising: custom context based on the context template; custom native code comprising one or more computer executable functions based on the native function template; and a custom prompt configured to prompt a large language model based on the semantic prompt template; generating a plugin based on the modified code template; and storing the plugin within a database of a plugin registry.

Optionally, generating the plugin comprises: packaging the modified code template as a containerized application programming interface (API).

Optionally, the custom prompt is configured to prompt the large language model based on a user input.

Optionally, the one or more functions of the custom native code, when executed, connect the plugin to any of an external API, a database, a file, and a different plugin.

Optionally, the one or more functions of the custom native code, when executed, store at least one of user inputs received via the application and outputs generated by the large language model in a memory.

Optionally, the custom context defines metadata associated with the plugin based on the context template.

Optionally, the metadata defines any one or more of: one or more applications for which the plugin is configured; a plugin identifier; one or more APIs through which the plugin can be called; a version of the plugin; a semantic description of the plugin; a file upload configuration; a required credential for accessing the plugin; an embedding model for which the plugin is configured; a large language model for which the plugin is configured; one or more hyperparameters for the large language model; and configurations for one or more cloud computing environments.

Optionally, the method includes receiving, at the plugin registry, a request for the plugin from an application of the one or more applications; and connecting the plugin to the application in response to the request.

Optionally, the plugin comprises first computer executable code configured to be executed in a first cloud computing environment and second computer executable code configured to be executed in a first cloud computing environment.

Optionally, the method includes executing a performance check on the generated plugin, the performance check comprising comparing a plugin performance level to a predefined performance threshold.

Optionally, the method includes registering the plugin with a plugin registry in accordance with determining the plugin performance level exceeds the predefined threshold.

According to an aspect, an exemplary system for creating and deploying plugins for use with one or more web-hosted large language model applications comprises one or more processors and memory storing one or more computer programs that include computer instructions, which when executed by the one or more processors, cause the system to: display a user interface comprising a code template for creation of a plugin, wherein the code template comprises a context template, a native function template, and a semantic prompt template; receive modifications to the code template via the user interface to form a modified code template, the modified code template comprising: custom context based on the context template; custom native code comprising one or more computer executable functions based on the native function template; and a custom prompt configured to prompt a large language model based on the semantic prompt template; generate a plugin based on the modified code template; and store the plugin within a database of a plugin registry.

According to an aspect, an exemplary non-transitory computer readable storage medium stores instructions for creating and deploying plugins for use with one or more web-hosted large language model applications, the instructions configured to be executed by one or more processors of a computing system to cause the system to: display a user interface comprising a code template for creation of a plugin, wherein the code template comprises a context template, a native function template, and a semantic prompt template; receive modifications to the code template via the user interface to form a modified code template, the modified code template comprising: custom context based on the context template; custom native code comprising one or more computer executable functions based on the native function template; and a custom prompt configured to prompt a large language model based on the semantic prompt template; generate a plugin based on the modified code template; and store the plugin within a database of a plugin registry.

According to an aspect, a method for connecting a plugin to an application comprises: at a plugin registry: receiving, from an application, a plugin discovery request wherein the request includes an application identifier for identifying one or more plugins configured to be connected to the application; querying a database to identify one or more plugins configured to be connected to the application by matching the identifier to one or more applications stored in the database based on an indication of a compatible application associated with the plugin; transmitting, to the application, an indication of one or more plugins configured to be connected to the application in response to the discovery request; receiving a selection of at least one plugin of the one or more plugins configured to be connected to the application; connecting the selected plugin to the application; at the application: receiving a user input via a user interface of the application; processing the user input using the plugin and the application, wherein processing the user input comprises selecting one or more functions of the plugin to execute based on the input; executing the one or more functions to generate an output.

Optionally, the method comprises displaying the output at a user interface of the application.

Optionally, the user input comprises at least one of: a natural language input, one or more files, a selection of a user affordance, or any combination thereof.

Optionally, the one or more functions, when executed, are configured to perform at least one of: connecting the plugin to any of an external API, a database, a file, and a different plugin; storing at least one of user inputs received via the application and outputs generated by a large language model in a memory; manipulating data included in the user input; and manipulating data obtained from a database based on the user input.

Optionally, the one or more functions are selected based on the input by classifying an intent based on the user input; and selecting one or more functions based on the intent.

Optionally, the one or more functions are selected based on a comparison between a semantic description of the one or more functions and the user input.

Optionally, the one or more functions are selected based on the input manually using function chaining or automatically using a planner.

Optionally, the output comprises any of a natural language output, a structured data output, an image data output, or any combination thereof.

Optionally, the method comprises: automatically reconfiguring the user interface of the application to display one or more selectable affordances based on the indication of the one or more plugins; and receiving a user selection of an affordance of the one or more selectable affordances.

Optionally, the method comprises: reconfiguring the user interface upon user selection of the affordance of the one or more selectable affordances to display a user authentication request, the authentication request comprising a prompt for a user credential.

Optionally, the indication of the compatible application is stored in a metadata field of the plugin.

Optionally, connecting the selected plugin to the application comprises connecting the application to an application programming interface associated with the plugin.

Optionally, the one or more plugins are containerized application programming interfaces (APIs).

Optionally, the one or more plugins are configurable for deployment to a plurality of different cloud computing environments.

Optionally, the one or more plugins comprise context, at least one native function, and at least one semantic prompt configured to prompt a large language model.

Optionally, connecting the plugin to the application comprises authenticating at least one of a user credential, an application credential, and an organization credential.

According to an aspect, an exemplary system for connecting a plugin to an application comprises one or more processors and memory storing one or more computer programs that include computer instructions, which when executed by the one or more processors, cause the system to: at a plugin registry: receive, from an application, a plugin discovery request wherein the request includes an application identifier for identifying one or more plugins configured to be connected to the application; query a database to identify one or more plugins configured to be connected to the application by matching the identifier to one or more applications stored in the database based on an indication of a compatible application associated with the plugin; transmit, to the application, an indication of one or more plugins configured to be connected to the application in response to the discovery request; receive a selection of at least one plugin of the one or more plugins configured to be connected to the application; connecting the selected plugin to the application; at the application: receive a user input via a user interface of the application; process the user input using the plugin and the application, wherein processing the user input comprises selecting one or more functions of the plugin to execute based on the input; execute the one or more functions to generate an output.

According to an aspect, an exemplary non-transitory computer readable storage medium stored instructions for connecting a plugin to an application, the instructions configured to be executed by one or more processors of a computing system to cause the system to: at a plugin registry: receive, from an application, a plugin discovery request wherein the request includes an application identifier for identifying one or more plugins configured to be connected to the application; query a database to identify one or more plugins configured to be connected to the application by matching the identifier to one or more applications stored in the database based on an indication of a compatible application associated with the plugin; transmit, to the application, an indication of one or more plugins configured to be connected to the application in response to the discovery request; receive a selection of at least one plugin of the one or more plugins configured to be connected to the application; connecting the selected plugin to the application; at the application: receive a user input via a user interface of the application; process the user input using the plugin and the application, wherein processing the user input comprises selecting one or more functions of the plugin to execute based on the input; execute the one or more functions to generate an output.

In some embodiments, any one or more of the characteristics of any one or more of the systems, methods, and/or computer-readable storage mediums recited above may be combined, in whole or in part, with one another and/or with any other features or characteristics described elsewhere herein.

BRIEF DESCRIPTION OF THE FIGURES

A better understanding of the features and advantages of the present disclosure will be obtained by reference to the following detailed description that sets forth illustrative embodiments, in which the principles of the disclosure are utilized, and the accompanying drawings of which:

FIG. 7 illustrates an exemplary interface for accessing a code template, according to some examples.

FIG. 10 illustrates an exemplary manifest.json file of a code template, according to some examples.

FIG. 11 illustrates an exemplary openapi.yaml file of a code template, according to some examples.

FIG. 12 illustrates another exemplary openapi.yaml file of a code template, according to some examples.

FIG. 14 illustrates an exemplary AZURE-pipeline.yaml file of a code template, according to some examples.

FIG. 16 illustrates an exemplary.env file of a code template, according to some examples.

FIG. 17 illustrates an exemplary Dockerfile of a code template, according to some examples.

FIG. 18 illustrates an exemplary pyproject.toml file of a code template, according to some examples.

FIG. 19 illustrates an exemplary app.py file of a code template, according to some examples.

FIG. 21 illustrates an exemplary config.json file of a code template, according to some examples.

FIG. 22 illustrates an exemplary working plugin code that was built using the code template, according to some examples.

FIG. 23 illustrates an exemplary user interface of an application for enabling plugins, according to some examples.

DETAILED DESCRIPTION

Figure 1A:
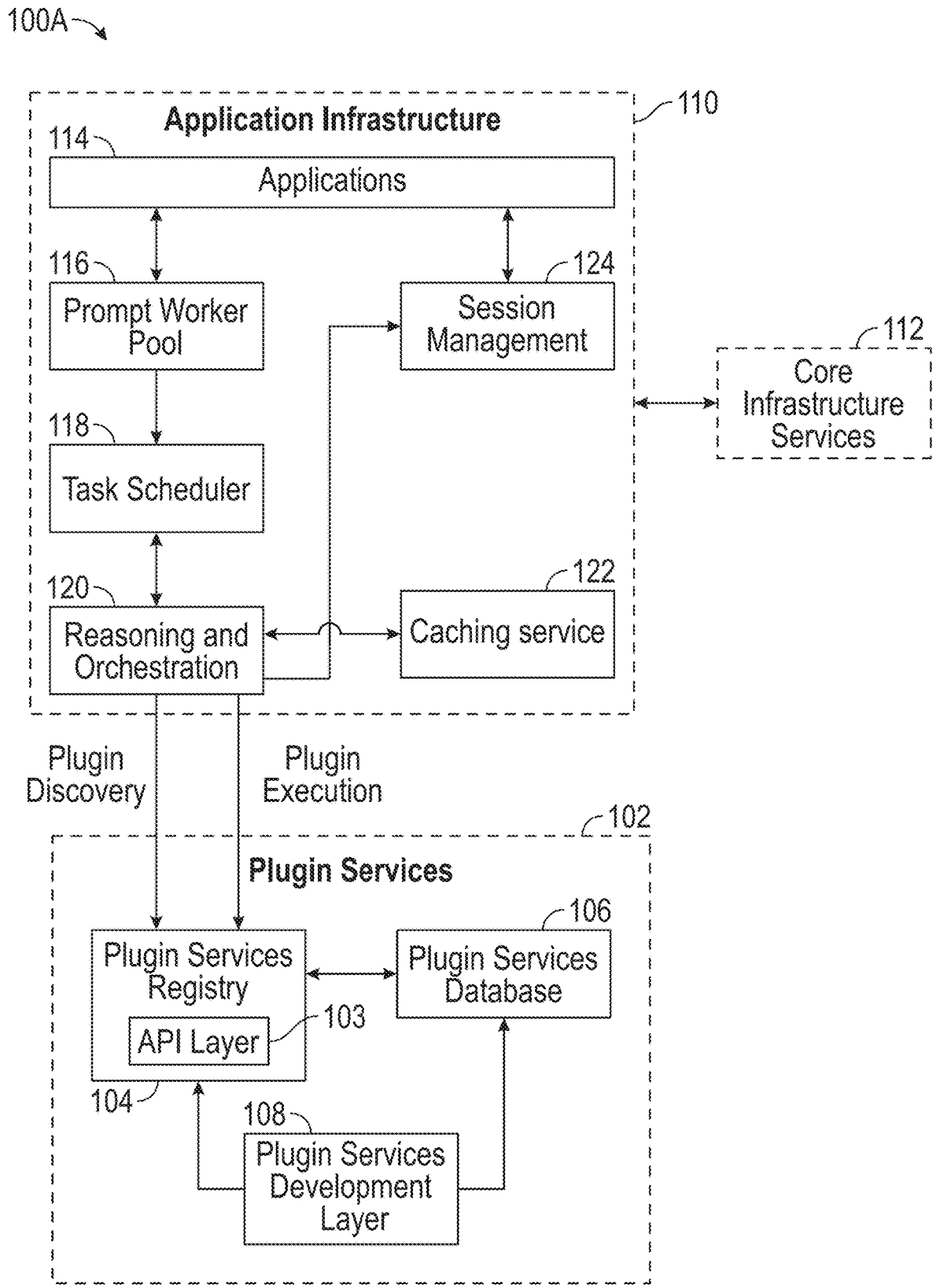
FIG. 1A illustrates an exemplary system for creation and deployment of plugins, according to some examples.

Disclosed herein are systems and methods for the creation, deployment, and integration of plugins with large language model applications. The systems and methods disclosed herein aim to address the limitations of current systems that utilize plugins by enabling plugin creation, deployment, and integration in a standardized, scalable, and cloud-agnostic manner to add additional functionality to LLM powered applications across different platforms and cloud computing environments.

To create a plugin, developers can retrieve standardized code templates from an online repository. The code templates may include a context template, a native function template, and a semantic prompt template. The context template may be configured to enable users to add context (e.g., metadata) associated with their plugin, the prompt template may be configured to enable addition of custom LLM prompts, and the native function template may be configured to enable users to add functions/logic configured to call computer executable code (e.g., C# or Python code) to manipulate data and/or perform other operations. The templates may be configured to enable developers to add their own custom code, including prompts for instructing LLMs, context/metadata, memories, connectors, and other functions to the code template in a standardized manner for efficient plugin creation and deployment. The term template as used herein may be understood to include folders, files, code repositories, and/or structured/predefined fields within a code repository. As used herein, the term field may refer to a GUI field where a user is prompted to input a string, float, char, integer, Boolean, etc., a portion of code where a user is prompted to insert a string, float, char, integer, Boolean, etc., and/or a portion of code that is configured to be replaced by a user-inputted string, float, char, integer, Boolean, etc.

A plugin created based on the modified code template may be deployed to and registered with an online registry and database. In some examples, the plugin is deployed as a containerized application programming interface (API). In some examples, a docker file is called based on one or more aspects of the code template, a container image (e.g., containerized API) is created based on the docker file and the modified code template, and the container image is automatically registered with a registry and/or stored in a database such that it is discoverable by one or more applications. Once registered, the plugin may be discoverable to various applications (e.g., enterprise applications, web-based applications, and so on) via the plugin registry. For instance, the plugin may be registered and stored in association with various context included in the modified code template, including identifiers, API keys, semantic descriptions, and so on, that enable applications to discovery the plugins via an API of the registry and connect to the plugin.

Applications may send plugin discovery requests to the plugin registry. The discovery request may include various identifiers, authorization credentials, etc. that enable the plugin registry to select and return one or more plugins responsive to the request. For instance, a discovery request may include an application identifier and/or an authorization credential for any one or more of a user, the application, or an organization. The plugin registry may query a database to identify plugins configured to be connected to the application based on the application identifier and/or credential(s). Context included in and/or stored in association with the plugins may indicate whether a given plugin is compatible with the requesting application and/or accessible based on the provided credentials. The plugin registry may return indications of the plugins to which the application can connect to the application.

The indications of the plugins provided by the registry may enable the application to connect to the respective plugins. In some examples, the indications of the plugins may enable the application to configure a user interface to display visual indications of one or more different plugins to which the application can connect. The visual indications may include user selectable affordances that a user can select to enable the plugin within the application. In some examples, the indications of the plugins transmitted from the registry may prompt the application for authorization credentials and/or cause the application to prompt a user for authorization credentials before enabling the plugin. In some examples, the indications of the plugins may enable the application to automatically connect to one or more of the plugins with or without user input.

In some examples, the registry may provide indications of the available plugins based on a discovery request, and the application may call the available plugins based on the returned indication. In response to the call, the plugins may provide information to the application to enable the application to configure the user interface, for instance, to depict one or more user selectable affordances to enable a user to select one or more plugins to enable. In some examples, the plugins may provide information to the application to cause the application to prompt a user for a credential and/or that prompt the application for a credential. In some examples, an authorization process may be performed automatically between the application and the one or more plugins called by the application.

In some examples, connecting the plugin to a respective application may automatically enable and/or execute cloud-specific and/or AI model-specific functionality (e.g., context, native functions, prompts, etc.) included in the plugin. For instance, a plugin connected to a GPT-4 based application hosted on AZURE may automatically enable and/or execute functionality associated with the GPT-4 LLM and the AZURE cloud. Connected plugins may process user inputs (e.g., prompts, file uploads, media data) received via the user interface of the application. Processing the user input may include selecting one or more functions of the plugin to execute based on the input and executing the one or more selected functions to generate an output. Multiple functions within and/or across plugins may be utilized by the plugin (e.g., via function chaining and/or a planner) to process a user input and generate an output, which may be displayed to a user via the user interface.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The structure for a variety of these systems will appear from the description below. In addition, the present invention is not described with reference to any particular programming language. It will be appreciated that a variety of programming languages may be used to implement the teachings of the present disclosure as described herein.

FIG. 1A illustrates an exemplary system architecture of a system 100 for creating and deploying plugins for use with web-hosted large language model applications. Each of the components illustrated in FIG. 1A may be connected to/powered by one or more processors. Each component may be connected to the same processor or one or more different processors. In some examples, functionality and/or hardware infrastructure for the different components may overlap with one or more other components. System 100 may include a plugin services platform 102 that includes a registry connected to a database 106. The registry 104 may include an application programming interface (API) 103 for interacting with application infrastructure 110 and/or database 106. The plugin services platform 102 may additionally include a plugin services development layer 108 for creating plugins. The plugin services platform 102 may enable users of the plugin services development layer 108 to access code templates for plugins that can be customized and deployed to the plugin services registry 104 and stored in database 106, for instance, as a containerized API.

As used herein, the term plugin may refer to computer software that extends the capabilities of LLMs and/or applications through, for instance, use of prompts, context, native code, vector databases, and/or embeddings. Plugins may include one or more prompts, context, and native code. A plugin may also include memories and/or connectors. The memories and/or connectors may form part of the native code. The memories may be configured to maintain conversation history and context in a memory that can be used for informing the LLM through a context window (e.g., by embedding and storing embedded prompts and LLM responses in a vector database, or otherwise storing interaction data in a memory, such as in process memory). The connectors may be configured to connect to other tools (e.g., other plugins, databases, webpages, and so on). The prompts may include natural language phrases used to interact with and instruct large language models. The context may include metadata that provides applications and LLMs additional information with respect to which applications the plugin can be integrated with, how the execute the plugin, and how to generate responses using the LLMs. The context may include public and private data that can be input to the large language model alongside prompts, which may improve response accuracy. The native code may include one or more functions configured to provide custom functionality to help with prompt chaining, invoking memories, querying other sources (e.g., other plugins, databases, webpages) for additional context, and/or executing an action based upon a model output. Plugins may be created and deployed using system 100, e.g., according to one or more steps of method 200 described below.

The plugin services platform 102 may be connected to application infrastructure 110 (e.g., via an API of the registry 104). The application infrastructure 110 may be a cloud hosted software platform and/or cloud native software platform. In some examples, application infrastructure 110 may be hosted on a local server. The application infrastructure 110 may be configured to run one or more applications 114. The applications 114 may be configured to be connected to one or more of the plugins from the plugin services platform 102. The applications 114 may be cloud/web-hosted applications configured to be connected to one or more AI models (e.g., large language models (LLMs)). The one or more AI models may accessible via core infrastructure services 112 connected to application infrastructure 110. Applications may connect to LLMs via different cloud services platforms. For instance, an application may connect to GPT-4 using the AZURE OPENAI API or to PaLM 2 using GOOGLE CLOUD PLATFORM (GCP).

The core infrastructure services 112 may include a plurality of software services configured to perform various tasks associated with application and plugin functionality. The core infrastructure services 112 may include any one or more of: cloud storage service(s) (e.g., AZURE BLOB SERVICES, AMAZON S3 BUCKETS), text extraction and optical character recognition (OCR) services (e.g., AZURE FORMS RECOGNIZER, AMAZON TEXTRACT), large language models (e.g., GPT-4, GPT-3.5, DALL-E, LLAMA, CLAUDE), using cloud services such as AZURE OPENAI and AWS BEDROCK, relational databases (e.g., AMAZON RELATIONAL DB), in-memory data store(s) and cache service(s) (e.g., AMAZON ELASTICACHE, AZURE REDIS CACHE), data ingestion service(s) (e.g., AZURE EVENT HUB, AMAZON EVENTBRIDGE), SQL server(s) (e.g., AZURE SQL SERVER), data lake(s) (e.g., ADLS Gen2 Storage), AI powered information retrieval services (e.g., AZURE AI SEARCH), analytics service(s) (e.g., AMAZON OPEN SEARCH), and external data source(s), among other services and tools.

The application infrastructure 110 may include a plurality of components configured to enable the application to run and to discover and execute plugins that may be connectable to the applications 114. In some examples, a prompt worker pool 116 is connected to applications 114. The prompt worker pool may be a software component configured to manage and distribute tasks among available workers (e.g., software components that execute assigned tasks, for instance, a plugin may be an instance of a worker and 1 to n plugins may be utilized to handle a load). The prompt worker pool 116 may be connected to a task scheduler 118. The task scheduler may be configured to schedule tasks for execution (e.g., based on triggers, such as time-based triggers). The task scheduler 118 may be connected to a reasoning and orchestration component 120. The reasoning and orchestration component 120 may be connected to plugin services platform 102. Reasoning and orchestration platform may be configured to discover and execute plugins via the plugin services registry API 104.

Figure 1B:
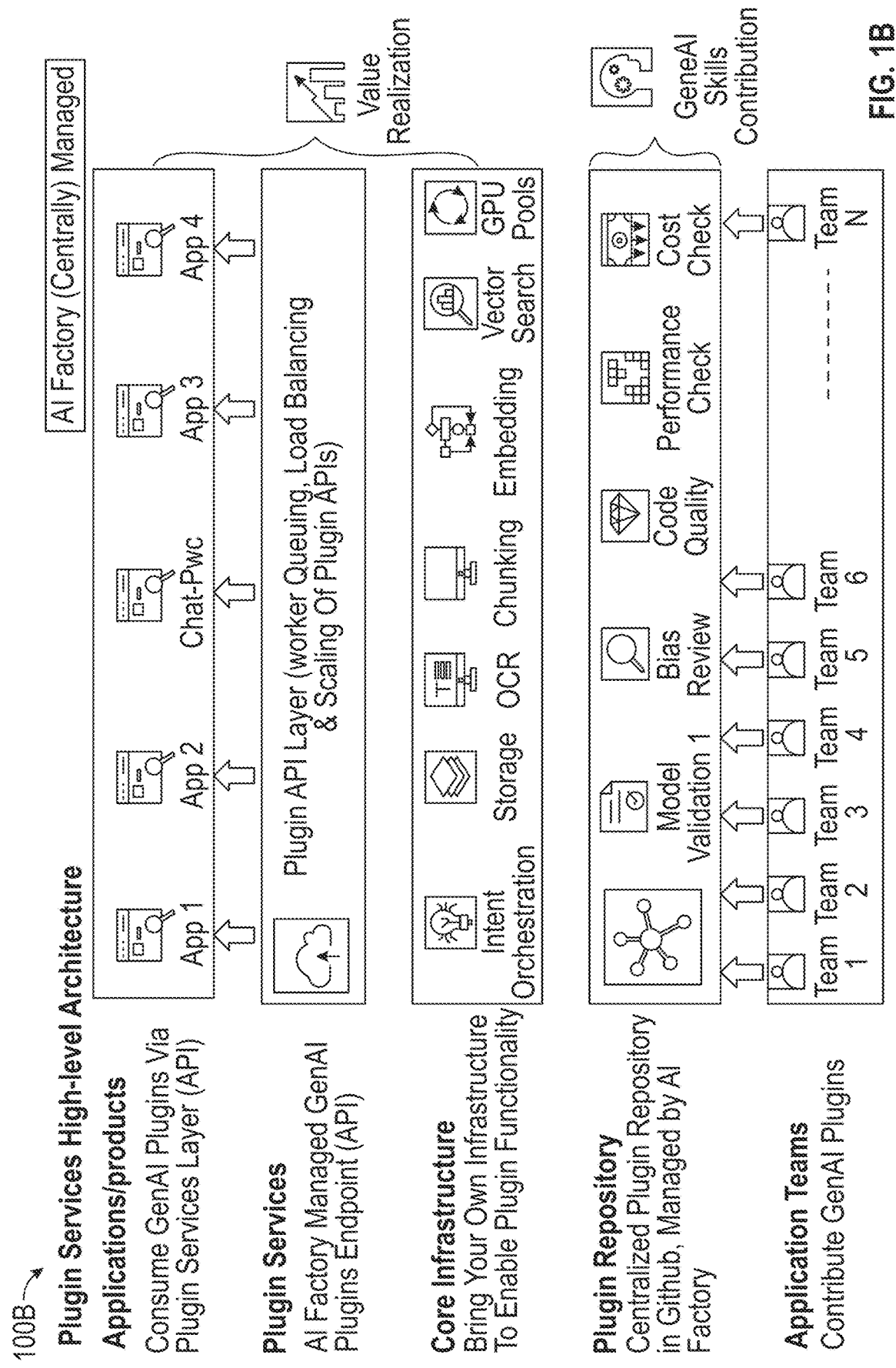
FIG. 1B illustrates a plugin creation and deployment architecture, according to some examples.

FIG. 1B illustrates a high-level system architecture of a system 100B. As shown in FIG. 1B, any number of development teams (and their associated electronic systems) can contribute to plugins that are deployed to a plugin repository, which may correspond to database 106 of FIG. 1A. During the plugin creation and deployment process, plugins may be subjected to various model validation bias reviews, code quality reviews, performance checks, and costs checks. Such reviews/checks may be performed automatically (e.g., algorithmically) by a plugin services platform (e.g., platform 102 of FIG. 1A) upon deployment of a plugin to the plugin repository, such as database 106. For instance, a plugin may be automatically evaluated according to various performance thresholds. If a plugin performance exceeds a threshold, it may proceed with registration at the registry (e.g., registry 104). If the plugin performance falls below a threshold, it may not proceed with registration at the registry. For instance, the development team (and/or a development system or subsystem) may be automatically notified of the failure and/or specific failure criteria requiring correction.

Once registered with the registry (e.g., registry 104), a plugin is discoverable via an API layer (e.g., API layer 103 of FIG. 1A) associated with the plugin services platform (e.g., platform 102). The API layer may perform worker queuing, load balancing, and scaling of Plugin APIs. A configuration (e.g. max number of plugins to scale up to) may be stored as configuration with the plugin code and/or plugin services platform, but the execution against that configuration may reside within a component of Kubernetes (KEDA or HPA). The API layer may enable communication between applications/products external to the plugin services platform and core infrastructure (e.g., core infrastructure services 112) such as intent orchestration, storage, OCR, chunking, embedding, vector search, GPU tools, and so on, that may exist, for instance, within an enterprise computing ecosystem. Systems 100A and 100B may be utilized to create, deploy, and interact with/execute various functionality associated with the plugins, as described in further detail with reference to the exemplary methods set forth below.

Figure 2:
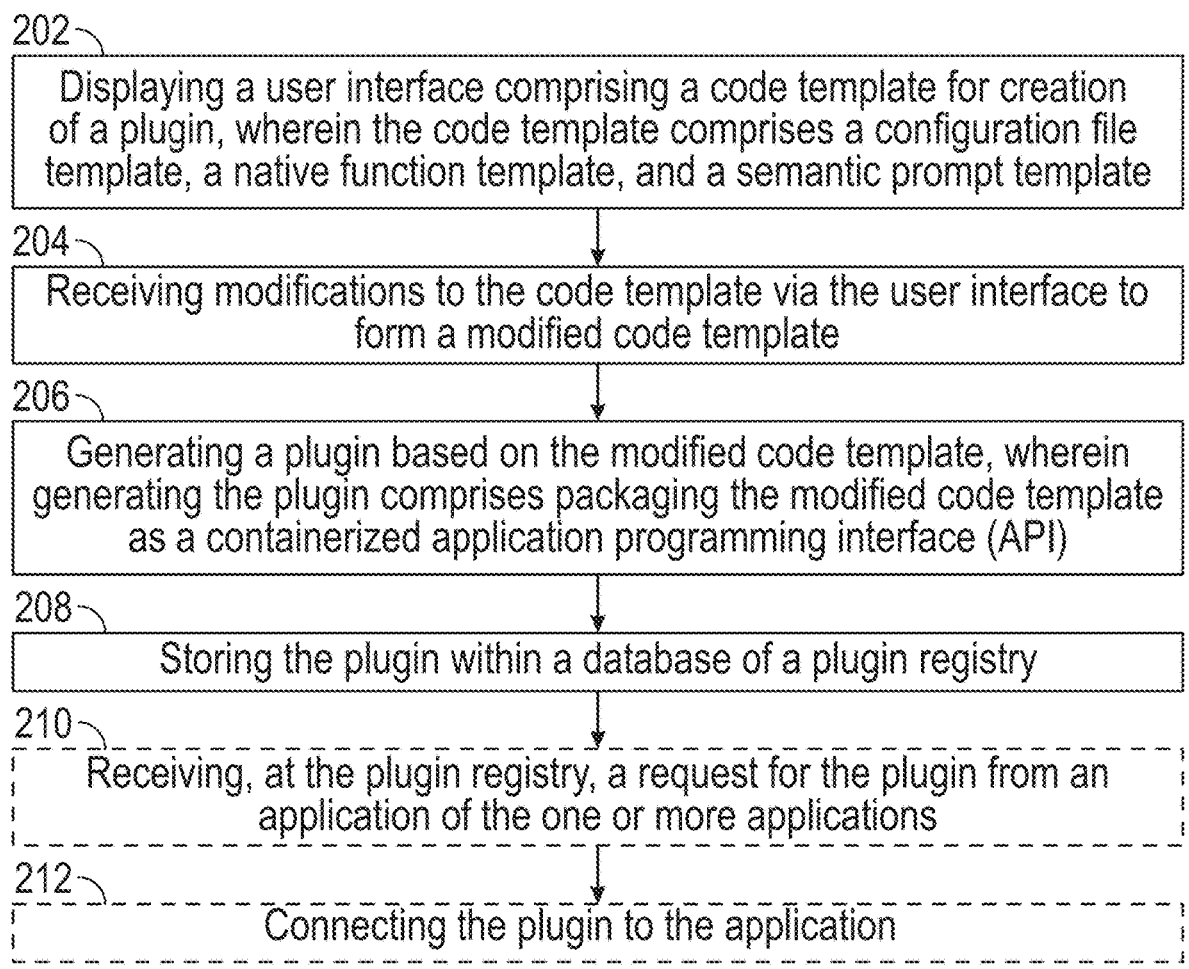
FIG. 2 illustrates an exemplary method for plugin creation and deployment, according to some examples.

FIG. 2 illustrates an exemplary process 200 for creating and deploying plugins for use with one or more web-hosted large language model applications. Process 200 is performed, for example, using one or more electronic devices implementing a software platform. Process 200 may be performed, for example, using plugin services component 102 and/or one or more other components of system 100A of FIG. 1A. In some examples, process 200 is performed using one or more electronic devices. In some embodiments, process 200 is performed using a client-server system, and the blocks of process 200 are divided up in any manner between the server and one or more client devices. Thus, while portions of process 200 are described herein as being performed by particular devices, it will be appreciated that process 200 is not so limited. In process 200, some blocks are, optionally, combined, the order of some blocks is, optionally, changed, and some blocks are, optionally, omitted. In some examples, additional steps may be performed in combination with the process 200. Accordingly, the operations as illustrated (and described in greater detail below) are exemplary by nature and, as such, should not be viewed as limiting.

At block 202, the process 200 may include displaying a user interface including a code template for creation of a plugin. The code template may include a context template, a native function template, and a semantic prompt template. The plugin may be constructed according to user inputs provided based on the code template. In some examples, the code template includes a common configuration that all plugins would use as default. The common configuration values may be overridden by a specific plugin configuration file values, but if no specific plugin configuration file values are provided (e.g., by a developer), the plugin may default to the common configuration. This common configuration helps streamline the process as only fields which different from the default or are specific to the plugin itself need to be populated. Thus, user inputs associated with the context template, a native function template, and a semantic prompt template may define various functionality of a plugin. The context template may include one or more preconfigured context/metadata fields for users to define metadata associated with a plugin. The preconfigured context/metadata fields may include any one or more of the following:

An application identifier field configured to receive an identifier and/or other information associated with an application for which the plugin is configured.

A plugin identifier field configured to receive an identifier (e.g., name) associated with a plugin.

A plugin resource locator field configured to receive a locator (e.g., URL, unique identifier for locating the plugin) for locating the plugin.

An API field configured to receive an indication of one or more APIs (e.g., API endpoints) through which the plugin can be called.

A plugin version field, configured to receive a plugin version indicator (e.g., version 1.0, 2.0, 2.1) which may be utilized to enable applications/users to request specific plugin versions (e.g., version 1.0, 2.0, 2.1) via a plugin request that may be initiated from an application.

A semantic description field configured to receive a plugin description that may be utilized to identify plugins responsive to a given plugin request and/or prompt received from via an application. The semantic description may be used for function chaining and/or or by a planner for selecting functions. An exemplary semantic description may recite "This tool is designed to do simple mathematical addition and square root calculation."

A large language model (LLM) field configured to receive an indication of one or more LLMs for which the plugin is configured. For instance, the large language model field configured to receive a URL, API endpoint, API key, etc., associated with one or more respective LLMs.

An LLM parameter/hyperparameter field configured to receive one or more parameters and/or hyperparameters for the large language model.

A file upload configuration field configured to receive an indication of a plugin capability for receiving files, permissible file types, file size limits, etc. For example, if a plugin is configured to receive file uploads, a user may define the file upload configuration field as True. If a plugin is not configured to receive file uploads, a user may define the file upload configuration field as False.

A authorization filed configured to receive an indication of one or more required authorization credentials (e.g., application credentials, organization credentials, user credentials, domain addresses, names, emails, or other identifiers) for accessing the plugin. The credentials may include private keys, passwords, usernames, application identifiers, and so on.

A cloud computing field configured to receive configurations for one or more cloud computing environments in which the plugin is configured to operate. The cloud computing field may define various plugin aspects (context, native functions, prompts, etc.) to be called depending on the cloud platform to which the plugin is connected. For instance, different plugin aspects may be called for AZURE than are called for GCP.

An chunking and/or embedding model field configured to receive an indication of one or more chunking and/or embedding models for which the plugin is configured.

The native function template may include one or more user modifiable native function fields configured to enable a user to define one or more native functions executable using the plugin. The term native function, as used herein, may refer to functions/logic configured to call computer executable code (e.g., C# or Python code) to manipulate data and/or perform other operations. Native functions can be used to save data, retrieve data, and/or perform any other operation that can be executed using code (including functions that may be ill-suited for LLMs, such as performing calculations). In some examples, the native functions may be configured to call other tools, including other plugins stored in a database connected to a plugin registry (e.g., registry 104 and database 106 described above). The semantic prompt template may include one or more user modifiable semantic prompt function fields. As used herein a semantic prompt (or prompt) may be an instruction or request provided to an LLM.

The user interface on which the code template is displayed may be displayed on an electronic device such as a personal computer, tablet, laptop, etc. The user interface may be configured to receive user inputs that are utilized by a system performing process 200 to create the plugin. The code template displayed on the user interface may include a plurality of user modifiable files that include the context template, native function template, prompt template, and so on. The user modifiable files may be organized into a hierarchical file structure that may enable a user to easily navigate to an applicable file (e.g., a native function file forming part of the native function template) within the overall code template. Exemplary aspects of the code template are shown in FIGS. 7-22.

At block 204, the process 200 may include receiving modifications to the code template via the user interface to form a modified code template. As noted above, the received modifications may include modifications to the context template, native function template, and/or semantic prompt template. Modifications to the context template may define context/metadata associated with the plugin based on the context template. In some examples, modifications to the context template may define one or more applications for which the plugin is configured. For instance, different plugins may be configured for integration with one or more different applications (e.g., web applications, mobile applications, other enterprise applications) but not for others. A user interacting with the code template may define the applications for which the plugin is configured using preconfigured metadata fields of the context template (e.g., the application identifier field described above). Once deployed, the plugin may be accessible or discoverable by applications for which it is configured/applications with identifiers provided in the application identifier field.

In some examples, modifications to the context template may define a large language model for which the plugin is configured. The user modifiable metadata fields may be preconfigured such that they request a user input indicating interoperability with one or more LLMs. The metadata field may be configured such that an identifier and/or resource locator of one or more LLMs can be received via the user interface. The identifier and/or resource locator may subsequently be utilized to call an LLM when the plugin is integrated with an application. In some examples, modifications to the context template may define custom context (e.g., parameters, hyperparameters) associated with the respective LLM. The custom context may include custom temperature, token length, stop sequences, etc., that configure the LLM for use with the plugin. In some examples, the context template may be preconfigured with user modifiable metadata fields defining one or more hyperparameters for the large language model.

In some examples, modifications to the context template may define a plugin identifier. The plugin identifier may include a name for the plugin (e.g., "question and answer plugin," "math plugin"), or any other identifier including, but not limited to, a Universally Unique Identifier, Globally Unique Identifier, hash-based identifier, collision-resistant unique identifier, and so on. In some examples, modifications to the context template may define a resource locator for locating/executing the plugin. The resource locator may include any resource locator, including, but not limiting to, uniform resource identifier (URI), a uniform resource locator (URL), and so on. In some examples, modifications to the context template may define a version of the plugin, for instance, version 1.0, 1.1, 2.0, etc.

In some examples, modifications to the context template may define a semantic description of the plugin. The semantic description may be a brief natural language description of a plugin (e.g., the functionality/purpose of the plugin). Exemplary descriptions include "this tool is to summarize documents," "this tool is for retrieving accounting information from 10k documents," "this tool is for answering questions about financial information," and so on. The semantic description may be used (optionally in combination with the plugin identifier, version, and other information) to select a plugin responsive to a discovery request and/or user prompt, as described further below.

In some examples, modifications to the context template may include custom context/configurations for different cloud computing platforms/environments. The modified context template may enable a plugin to function across different cloud computing platforms/environments. For instance, one or more aspects of a plugin (e.g., a specific LLM, specific prompts, specific native functions), may be tailored for one cloud computing environment (e.g., OPENAI) while a different one or more aspects of the plugin may be tailored for a difference cloud computing environment (e.g., AWS, AZURE, GCP). Upon connection to a cloud computing platform/environment, the plugin may automatically employ the appropriate functionality for that cloud computing platform/environment. In some examples, modifications received to the native function template and/or prompt template additionally, or alternatively, define cloud computing platform/environment-specific functionality for the plugin that is automatically employed when connected to the respective environment.

In some examples, modifications to the context template may specify, indicate, or define one or more APIs (or components associated therewith) through which the plugin can be called. In some examples, the modifications may define API endpoints, API keys, and/or other identifying information used to register the plugin with a registry (e.g., registry 104) and call the plugin using via the registry. In some examples, modifications to the context template may define a file upload configuration for the plugin. As noted, a user may define the configuration as True if the plugin is configured to receive file uploads and False if the plugin is not configured to receive file uploads. In some examples, modifications to the plugin template further define permissible file types, size limits, document number limits, and so on. In some examples, modifications to the context template may define metadata including a required authorization credential for accessing the plugin. For instance, the context template may be configured to receive inputs that configure the plugin to require credentials (e.g., user credentials, application credentials, organization credentials) for accessing/using the plugin. In some examples, modifications to the context template may define metadata including a chunking and/or embedding model for which the plugin is configured.

In some examples, modifications to the context template may define metadata including configurations for one or more cloud computing environments. For instance, as described above, the plugin may be configured such that a first portion of context/metadata (or other aspect of the plugin, including prompts, native functions, memories, and so on) is utilized in a first cloud computing environment, and a second portion of context/metadata (or other aspect of the plugin, including prompts, native functions, memories, and so on) is utilized in a second cloud computing environment. The plugin may include any number of cloud-specific, LLM-specific, operating system-specific, or other environment-tailored aspects that are automatically implemented/executed while the plugin is operating in that environment.

A completed plugin may include prompts, context, and native code. The prompts may include natural language phrases used to interact with and instruct large language models. The context may include metadata that provides applications and LLMs additional information with respect to which applications the plugin can be integrated with, how the execute the plugin, and how to generate responses using the LLMs. The context may include public and private data that can be input to the large language model alongside prompts, which may improve response accuracy. The native code may include one or more functions configured to provide custom functionality to help with prompt chaining, invoking memories, querying other sources (e.g., other plugins, databases, webpages) for additional context, and/or executing an action based upon model output.

In some examples, the plugins described herein may be created using LangChain or Semantic Kernel. Langchain and Semantic Kernel are two frameworks that can be used to create plugins that interact with large language models (LLMs). Semantic Kernel is an open-source software development kit (SDK) that makes it easy to integrate large language models (LLMs) into applications. It does this by providing a set of APIs that allow users to interact with LLMs from any programming language. The SDK provides a number of features that make it easy to create plugins that can interact with LLMs, including: a simple API that makes it easy to send requests to LLMs; a built-in function for generating prompts that can be provided to an LLM; and a library of pre-trained LLMs that can be used with a plugin. LangChain is another open-source framework for developing plugins that interact with LLMs. LangChain includes a ReAct agent that enables creation of plugins that can reason and plan. ReAct is a framework for building autonomous agents that can reason and act in the real world. ReAct is built on top of LangChain, which provides the underlying infrastructure for interacting with LLMs. ReAct works by first creating a language chain, which is a sequence of prompts that are used to guide the LLM through a task. The LLM then generates responses to each prompt, and these responses are used to update the language chain. This process continues until the LLM has completed the task. The Semantic Kernel SDK has a planner (e.g., for invoking a sequence of functions/plugins), but it is not as mature as the ReAct agent and it is not yet available in Python.

At block 206, the process 200 may include generating a plugin based on the modified code template. Generating the plugin may include packaging the modified code template as a containerized application programming interface (API). For instance, a docker file may be called based on one or more aspects of the code template (e.g., the AZURE-pipeline.yaml file depicted in FIG. 14), a container image (e.g., containerized API) is created based on the docker file and the modified code template, and the container image may be automatically registered with a registry and/or stored in a database such that it is discoverable by one or more applications. A container (e.g., containerized API, container image) is a packaged and portable computing environment that includes everything needed to run a plugin. The plugins disclosed herein are thus portable and scalable across different cloud environments, computing platforms, operating systems, etc. For instance, in some examples, a plugin may be packaged using Flask using OPENAI API standards.

At block 208, the process 200 may include storing the plugin within a database. The database may be hosted locally (e.g., on a local server), on a remote server, and/or in any cloud computing environment. The database may be included in a plugin registry and/or connected to a plugin registry, which may be or include an API. At block 210, the process 200 may include receiving, at the plugin registry, a discovery request for the plugin from an application (e.g., a LLM-enabled application). The plugin registry may return one or more indications of available plugins based on the discovery request. At block 212, the process 200 may include connecting the plugin to the application. The application may call the plugin directly based on the indications of the one or more available plugins. In some examples, the plugin registry may facilitate the connection. Additional detail regarding requesting plugins and connecting plugins to applications is provided below with reference to FIG. 3.

Figure 3:
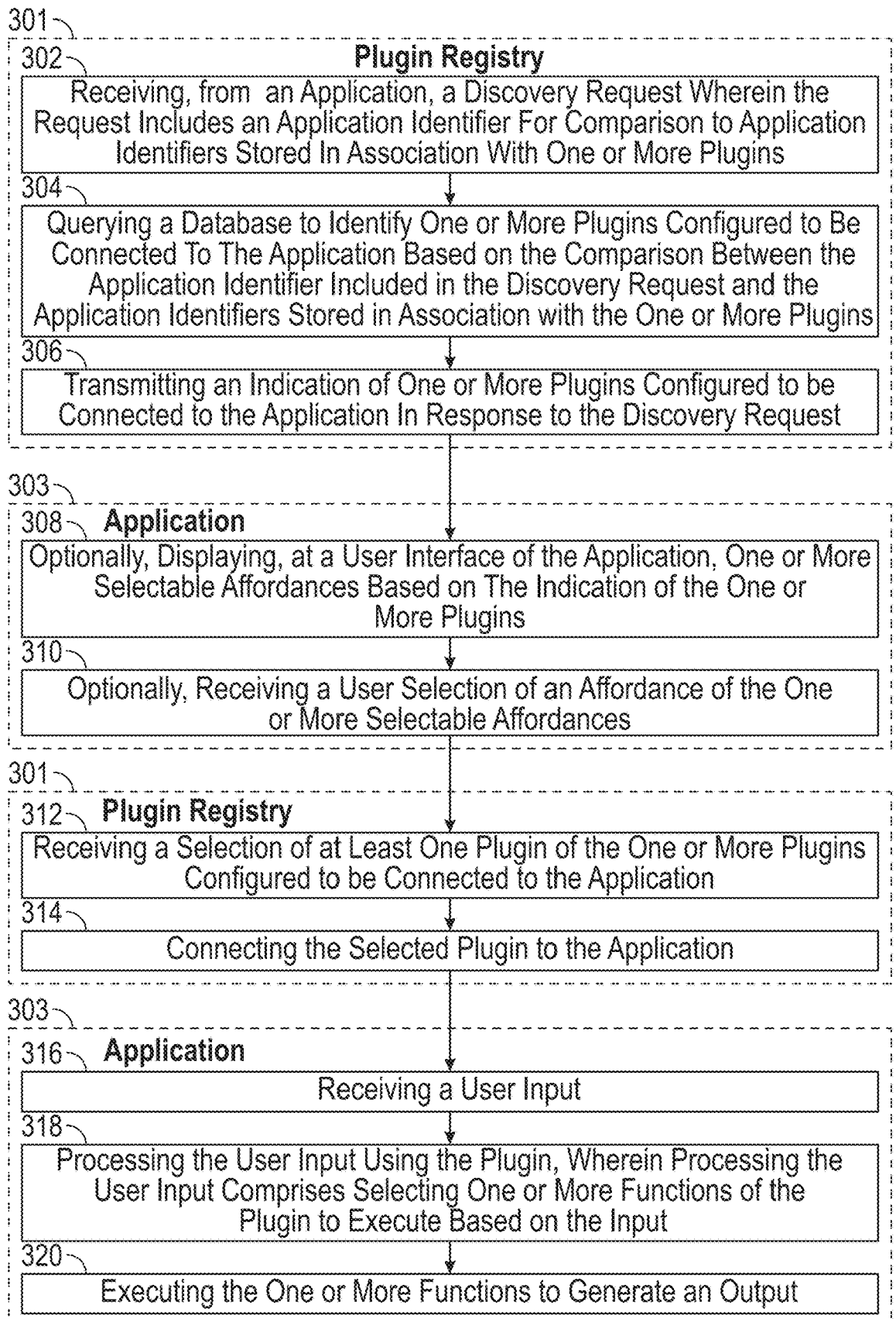
FIG. 3 illustrates an exemplary method for connecting selected plugins to applications and processing user inputs to generate an output, according to some examples.

FIG. 3 illustrates an exemplary process 300 for connecting a plugin to an application (e.g., a web hosted LLM powered applications). Process 300 is performed, for example, using one or more electronic devices implementing a software platform. In some examples, process 300 is performed using one or more electronic devices. In some embodiments, process 300 is performed using a client-server system, and the blocks of process 300 are divided up in any manner between the server and one or more client devices. Thus, while portions of process 300 are described herein as being performed by particular devices, it will be appreciated that process 300 is not so limited. In process 300, some blocks are, optionally, combined, the order of some blocks is, optionally, changed, and some blocks are, optionally, omitted. In some examples, additional steps may be performed in combination with the process 300. Accordingly, the operations as illustrated (and described in greater detail below) are exemplary by nature and, as such, should not be viewed as limiting.

At block 302, process 300 includes receiving, at a plugin registry 301 from an application 303, receiving, from an application, a plugin discovery request wherein the request includes an application identifier for identifying one or more plugins configured to be connected to the application. The application identifier may include a Universally Unique Identifier, Globally Unique Identifier, hash-based identifier, collision-resistant unique identifier, and/or any other identifying information. The identifier may be used to determine which plugins accessible via the registry are configured to connect to the respective application. In some examples, the discovery request includes one or more authorization credentials. The authorization credentials may include, for instance, user credentials, application credentials, and/or organization credentials. The authorization credentials may be compared to one or more authorization credential requirements (e.g., stored in plugin metadata) to determine whether the application, user, and/or organization associated with the application and/or user is permitted to access the plugin.

At block 304, process 300 may include querying, by the plugin registry 301, a database (or other memory/data structure) to identify one or more plugins configured to be connected to the application by matching the identifier to one or more applications stored in the database based on an indication of a compatible application associated with the plugin. The indication of the compatible application may be stored in a metadata field of the plugin. The indication of the compatible application may include an identifier corresponding to an application identifier, hash value, private key, or other identifier and/or authorization credential. The one or more plugins may have been created according to one or more steps of the method 200 described above. The one or more plugins may be containerized application programming interfaces (APIs). The one or more plugins may include context (e.g., any of the metadata described above with reference to process 200), at least one native function, and at least one semantic prompt configured to prompt a large language model.

The one or more plugins may be configured (e.g., using the code template described above with reference to FIG. 2) for deployment to a plurality of different cloud computing environments. The one or more plugins may additionally, or alternatively, be configured for utilization with applications and services built on a plurality of different open-source software development kits, including Semantic Kernel, LangChain, and others. The plugins may include a plurality of functions that can be orchestrated by the applications and/or services built on any of the plurality of different open-source software development kits. Plugin functions may be invoked manually using function chaining or automatically using a planner, as noted below with reference to block 318.

At block 306, process 300 may include transmitting, by the plugin registry 301 to the application 303, an indication of one or more plugins configured to be connected to the application in response to the discovery request. The indication may include a resource locator including, but not limited to, a uniform resource identifier (URI), a uniform resource locator (URL), and so on. In some examples, the indication may include a credential such as an API key. In some examples, the indication may be configured to prompt the application and/or user for a credential (e.g., email, password, API key, and so on). In some examples, the indication may include one or more versions of the one or more one or more plugins (e.g., so the application and/or user can select an appropriate version of a plugin). In some examples, the indication may be based on a customizable metadata field of the plugin. For instance, a creator of the plugin may specify within the plugin metadata that the plugin is only accessible to users with specific credentials, etc. In some examples, the indication includes a description of the plugin (e.g., a plugin name, description of plugin functionality, etc.). In some examples, the indication includes a visualization component configured to render a visualization of the plugin on the user interface of the application.

At block 308, process 300 may include, displaying, at a user interface (e.g., graphical user interface (GUI)) of the application 303, one or more selectable affordances based on the indication of the one or more plugins. At block 310, process 300 may include, at application 303, receiving a user selection of an affordance of the one or more selectable affordances. In some examples, the plugins may instead be selected/enabled automatically (e.g., using a planner and/or function chaining) based on a prompt received via the application 303. For instance, a prompt may be compared to a semantic description of one or more plugins (and/or descriptions of functions included in the plugins) to select one or more appropriate plugins for generating a response to the prompt. The one or more plugins may be selected based on a user input by classifying an intent of the user input and selecting one or more plugins based on the intent. The one or more plugins may be selected based on the input using function chaining or automatically using a planner.

At block 312, process 300 may include receiving, at plugin registry 301, a selection of at least one plugin of the one or more plugins configured to be connected to the application. At block 314, process 300 may include connecting the selected plugin to the application. Connecting the selected plugin to the application may include connecting the application to an application programming interface associated with the plugin. The application may call the plugin using one or more aspects included in the indication of the plugin (e.g., URI/URL, API key or other access token). In some examples, a plugin may be connected based on a user selection of an affordance (e.g., "enable plugin") provided on the user interface of the application, as described above. In some example, one or more plugins may be automatically connected to the application based on the indication of the one or more plugins received based on the transmission from the plugin registry at block 306. In some examples, all plugins configured to connect to the application may automatically be connected to the application upon receipt of the discovery request, optionally including one or more authorization credentials.

At block 316, process 300 may include, at the application 313, receiving a user input. The user input may include at least one of: a natural language input, one or more files, a selection of a user affordance, or any combination thereof. At block 318, process 300 may include, processing the user input using the plugin and/or application to which the plugin is connected. Processing the user input may include selecting one or more functions of the plugin to execute based on the input. The one or more functions may be selected based on the input by classifying an intent based on the user input and selecting one or more functions based on the intent. For instance, if a prompt or user request is provided to the plugin, the plugin may determine whether it understands what the user is requesting (e.g., intent) and whether can it fulfill that request with the information provided and functions it has available. For examples, if an input/prompt requests "order me a pizza" to a coffee plugin, the coffee plugin should realize it is unable to do that. If an input/prompt requests, "i want a black coffee," the coffee plugin may realize it can handle the request but that it needs to know whether you want sugar (it knows you do not want cream since you've requested black coffee) so it would need to ask for clarification regarding the sugar.

In some examples, intent determination/classification is performed using one or more LLMs (or other machine learning models). In some examples the same LLM used to generate a response to a user input is used to determine/classify an intent of the user input/prompt. In some examples, a different LLM may be used for intent classification than is used to generate a response to a user input. In some examples, the LLM used for intent classification is called by the application. In some examples, the LLM used for intent classification is called by the plugin. In some examples, the intent may be determined without using an LLM, for instance, by comparing aspects of a user input to one or more rules in a rule database, by extracting a vector representative of an intent from a user input and comparing the vector to one or more predefined intent classifications, or any other method for intent classification. Based on the intent, one or more functions within a plugin may be selected for execution. In some examples, one or more of the selected functions may call another plugin. In some examples, one or more plugins may be called based on an intent. For instance, an application may utilize an LLM to process an input to classify an intent and call one or more plugins based on the intent.

The one or more functions may be selected based on a comparison between a semantic description of the one or more functions and the user input. The one or more functions may be selected based on the input manually using function chaining or automatically using a planner. For example, each function of the one or more plugins may include a semantic description that outlines how the function behaves. The semantic description of each function may define inputs, outputs, and side effects of the function in a machine-readable manner. The semantic descriptions may enable a planner (a software component) to select a most appropriate function to execute based on a user input. In some examples, a planner may construct a sequence of functions and/or sequence of plugins based on a prompt/input. As noted above, the functions can be configured to perform any function executable using computer code. In some examples, one or more of the functions may be configured to perform any one or more of the following tasks: fetch data, chunk data, embed data, store embedded data in a vector store/vector database, develop a prompt, trigger a third-party API (e.g., a python function), evaluate an LLM response.

At block 320, process 300 may include executing the one or more functions to generate an output. The output may include any of a natural language output, a structured data output, an image data output, other media data output, or any combination thereof. In some examples, the output may be displayed at a user interface of the application 303. In some examples, the one or more functions, when executed, are configured to connect the plugin to any of an external API, a database, a file, and/or a different plugin. In some examples, the one or more functions, when executed, are configured to store at least one of user inputs received via the application and outputs generated by a large language model in a memory. In some examples, the one or more functions, when executed, are configured to manipulate data included in the user input (e.g., perform mathematical operations). In some examples, the one or more functions, when executed, are configured to manipulate data obtained from a database based on the user input.

Figure 4:
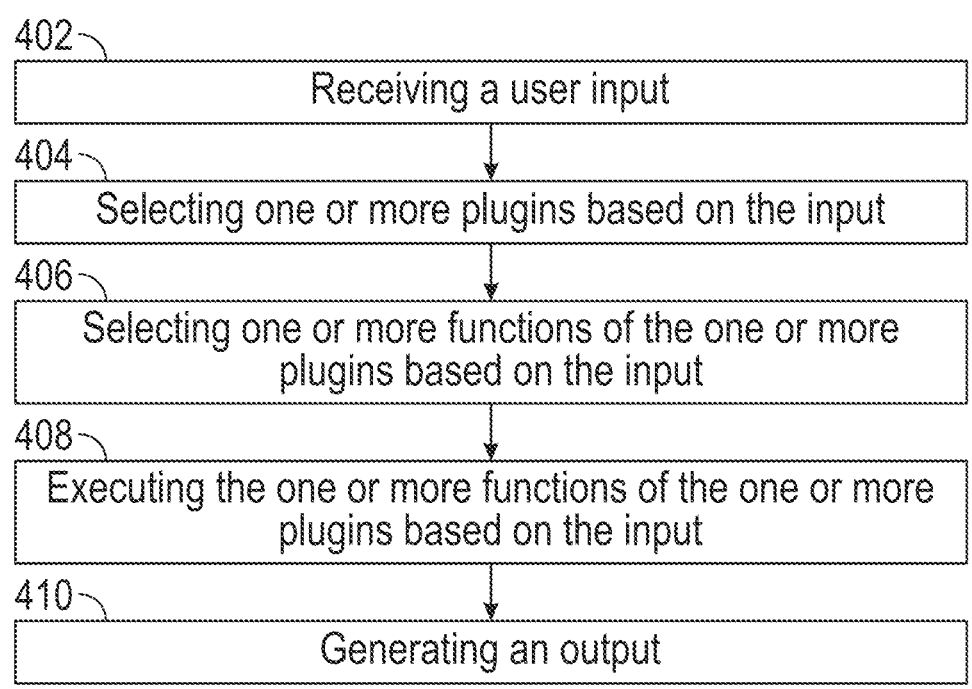
FIG. 4 illustrates another exemplary method for connecting plugins to applications based on user inputs and processing the user inputs to generate an output, according to some examples.

FIG. 4 illustrates a process 400 for dynamically selecting one or more plugins, and dynamically executing one or more functions included in the plugins based on a user input to generate an output. Process 400 is performed, for example, using one or more electronic devices implementing a software platform. In some examples, process 400 is performed using one or more electronic devices. In some embodiments, process 400 is performed using a client-server system, and the blocks of process 400 are divided up in any manner between the server and one or more client devices. Thus, while portions of process 400 are described herein as being performed by particular devices, it will be appreciated that process 400 is not so limited. In process 400, some blocks are, optionally, combined, the order of some blocks is, optionally, changed, and some blocks are, optionally, omitted. In some examples, additional steps may be performed in combination with the process 400. Accordingly, the operations as illustrated (and described in greater detail below) are exemplary by nature and, as such, should not be viewed as limiting.

At block 402, the process 400 may include receiving a user input (e.g., via a user interface of an application). The user input may include at least one of: a natural language input, one or more files, a selection of a user affordance, or any combination thereof. At block 404, the process 400 may include selecting one or more plugins associated with (e.g., registered with) a plugin registry based on the user input. In some examples, the one or more plugins are selected based on a comparison between the user input and a description of the plugin. The description of the plugin may describe one or more capabilities of the plugin (e.g., an ability to receive document uploads, perform mathematical operations, and so on). In some examples, the one or more plugins are selected at least in part based on a compatibility between the one or more plugins and the application (e.g., some plugins may be configured for connection with only certain applications). In some examples, the one or more plugins are selected at least in part based on a user credential (e.g., some users may have access to different applications than other users).

At block 406, the process 400 may include selecting one or more functions for execution based on the input. The one or more functions may be selected based on a classified intent of the user input. The intent may be classified by a trained LLM, as described above with reference to FIG. 3. The one or more functions may be selected based on a comparison between the user input and a description of the function. The description of the function may include a description of the function's inputs, outputs, and side effects defined in a machine-readable manner. In some examples, the one or more functions may be selected automatically using a planner (a software component configured to select appropriate functions based on a user input). In some examples, the one or more functions may be selected using function chaining.

At block 408, the process 400 may include executing the one or more functions of the one or more plugins based on the input. In some examples, the one or more functions, when executed, are configured to connect the plugin to any of an external API, a database, a file, and/or a different plugin. In some examples, the one or more functions, when executed, are configured to store at least one of user inputs received via the application and outputs generated by a large language model in a memory. In some examples, the one or more functions, when executed, are configured to manipulate data included in the user input (e.g., perform mathematical operations). In some examples, the one or more functions, when executed, are configured to manipulate data obtained from a database based on the user input. At block 410, the process 400 may include generating an output. The output may be displayed on a user interface of an application to which the plugin is connected. The output may be a media output (e.g., text, image, and/or video).

Exemplary Architectures

Figure 5:
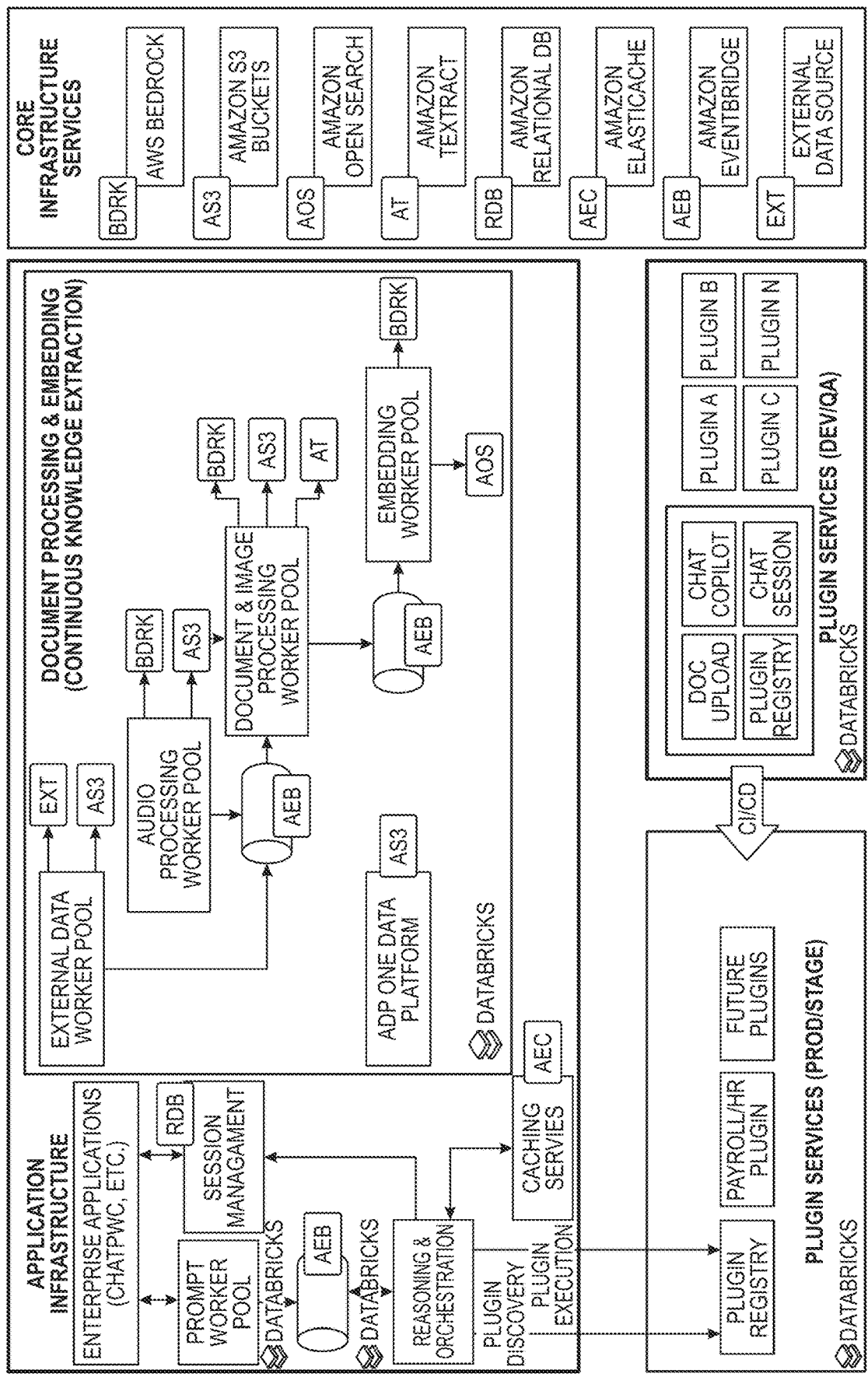
FIG. 5 illustrates an exemplary system architecture for plugin creation, deployment, and integration, according to some examples.
Figure 6:
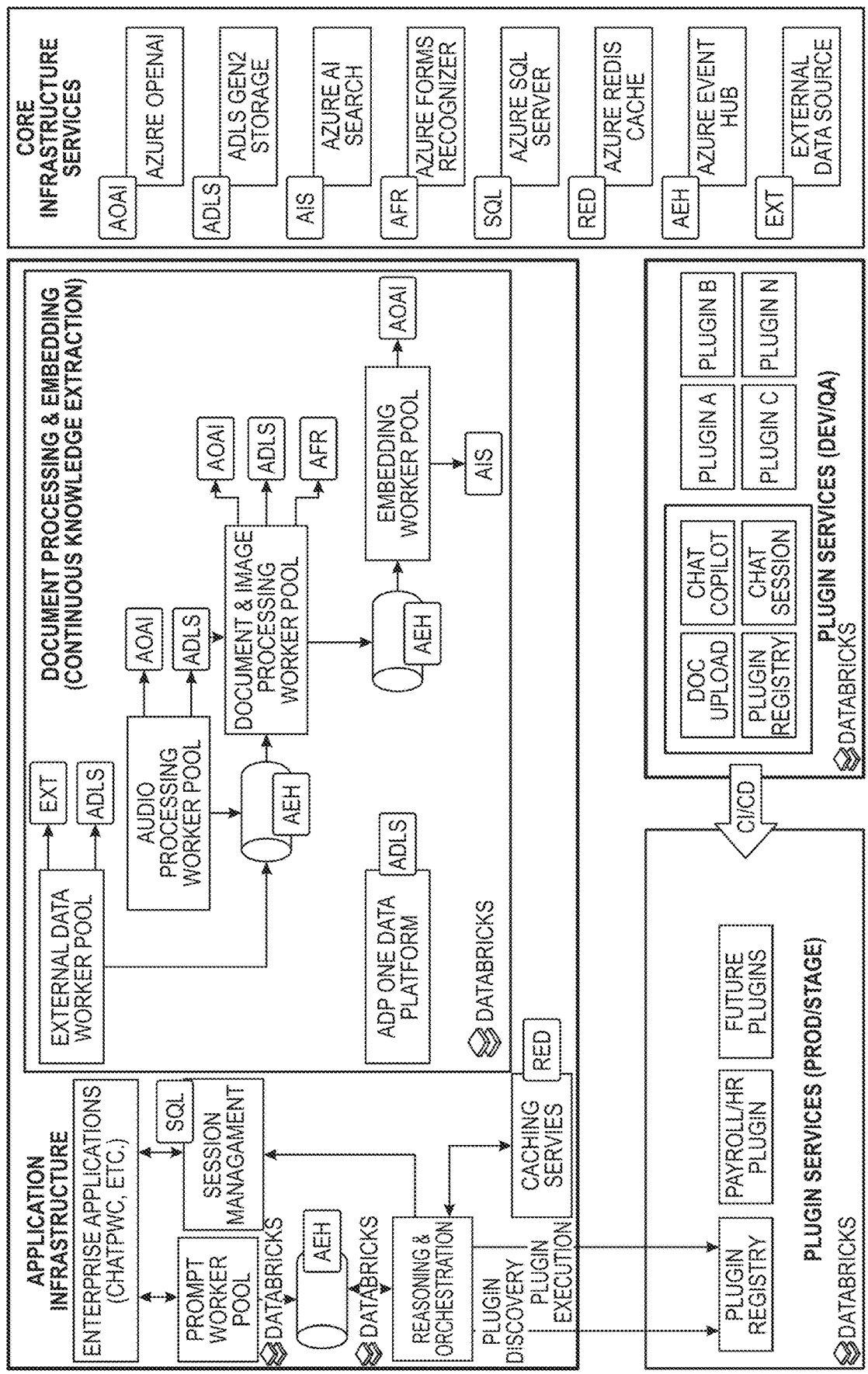
FIG. 6 illustrates another exemplary system architecture for plugin creation, deployment, and integration, according to some examples.

The plugin creation and deployment systems described herein support any plugin framework, including Microsoft Semantic Kernel, Langchain, and others. That is, the plugin creation and deployment systems and methods described herein are cloud and platform agnostic. Any framework can be integrated into the code templates described herein. Using the cloud agnostic approach described herein, plugins can be run natively on AZURE, AMAZON WEB SERVICES (AWS), and GOOGLE CLOUD (GCP). For example, FIG. 5 illustrates an exemplary system architecture that may be utilized for system 100 configured for integration with various MICROSOFT AZURE services and FIG. 6 illustrates an exemplary system architecture that may be utilized for system 100 configured for integration with various AWS services.

Exemplary Code Template Aspects

FIG. 7 illustrates an exemplary user interface for obtaining and cloning a plugin code template. A user may select a code template for creating a plugin (e.g., from the illustrated drop down menu). After selecting a code template, the user may clone the code template and modify the cloned code template to create a plugin, for instance, by modifying one or more aspects of the code template described with reference to FIGS. 10-22. While FIGS. 10-22 illustrate various specific components of an exemplary code template, it should be understood that additional or different components may be included. The exemplary aspects of the code template shown are by no means exhaustive, and meant to be exemplary rather than limiting.

Figure 8:
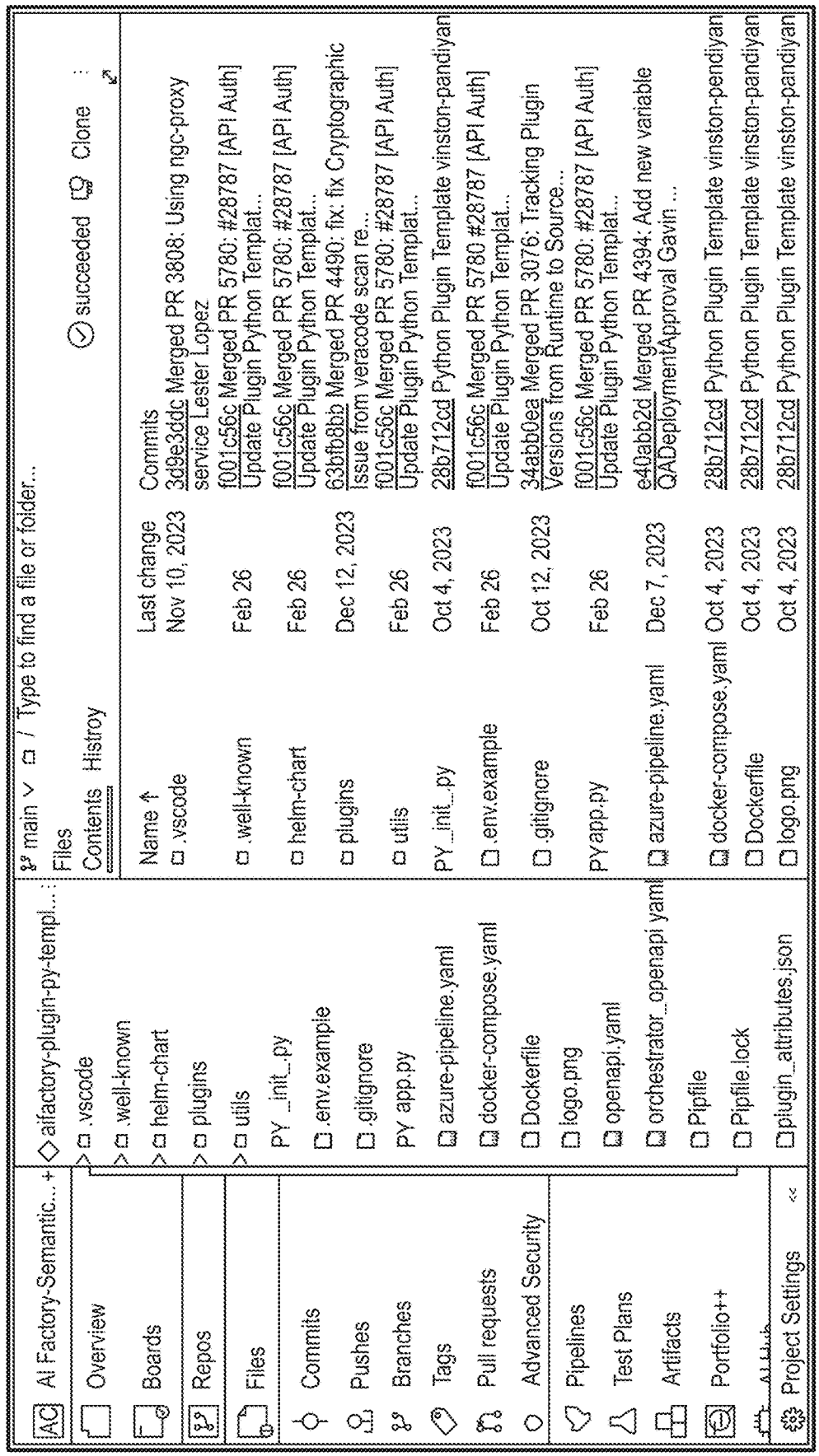
FIG. 8 illustrates an exemplary interface for cloning a code template, according to some examples.
Figure 9:
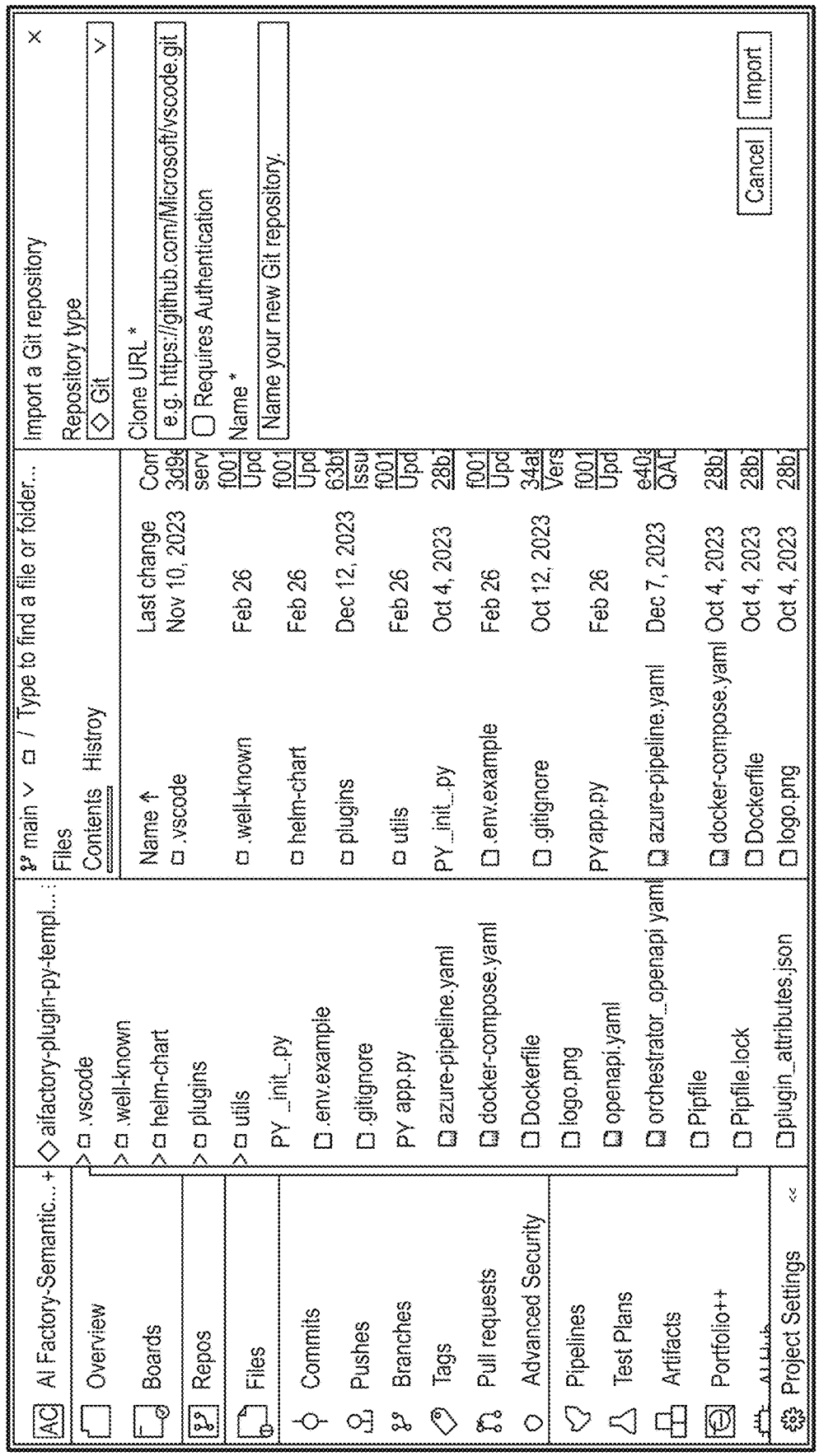
FIG. 9 illustrates another aspect of the exemplary interface for cloning a code template, according to some examples.

FIG. 8 illustrates a user interface that depicts various exemplary files and folders that may be included in a code template for creation of an exemplary plugin. FIG. 9 illustrates an aspect of the exemplary user interface of FIG. 8 that enables a user to import a cloned code template as a Git repository in, for instance Visual Studio, to modify the code template and create a plugin. The code template can be opened in Visual Studio using a URL or other resource locator associated with the code template.

Figure 10:
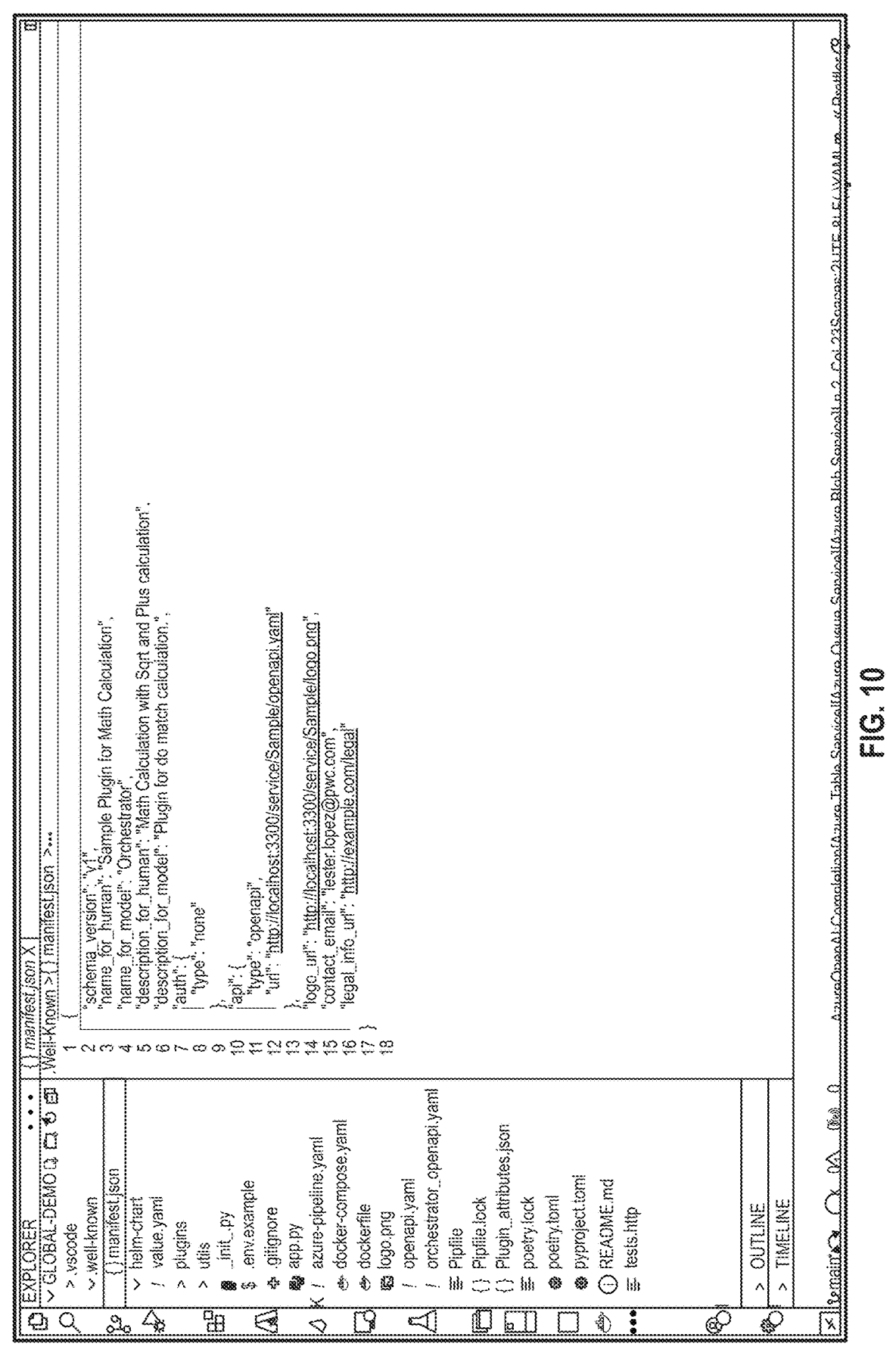
Figure 11:
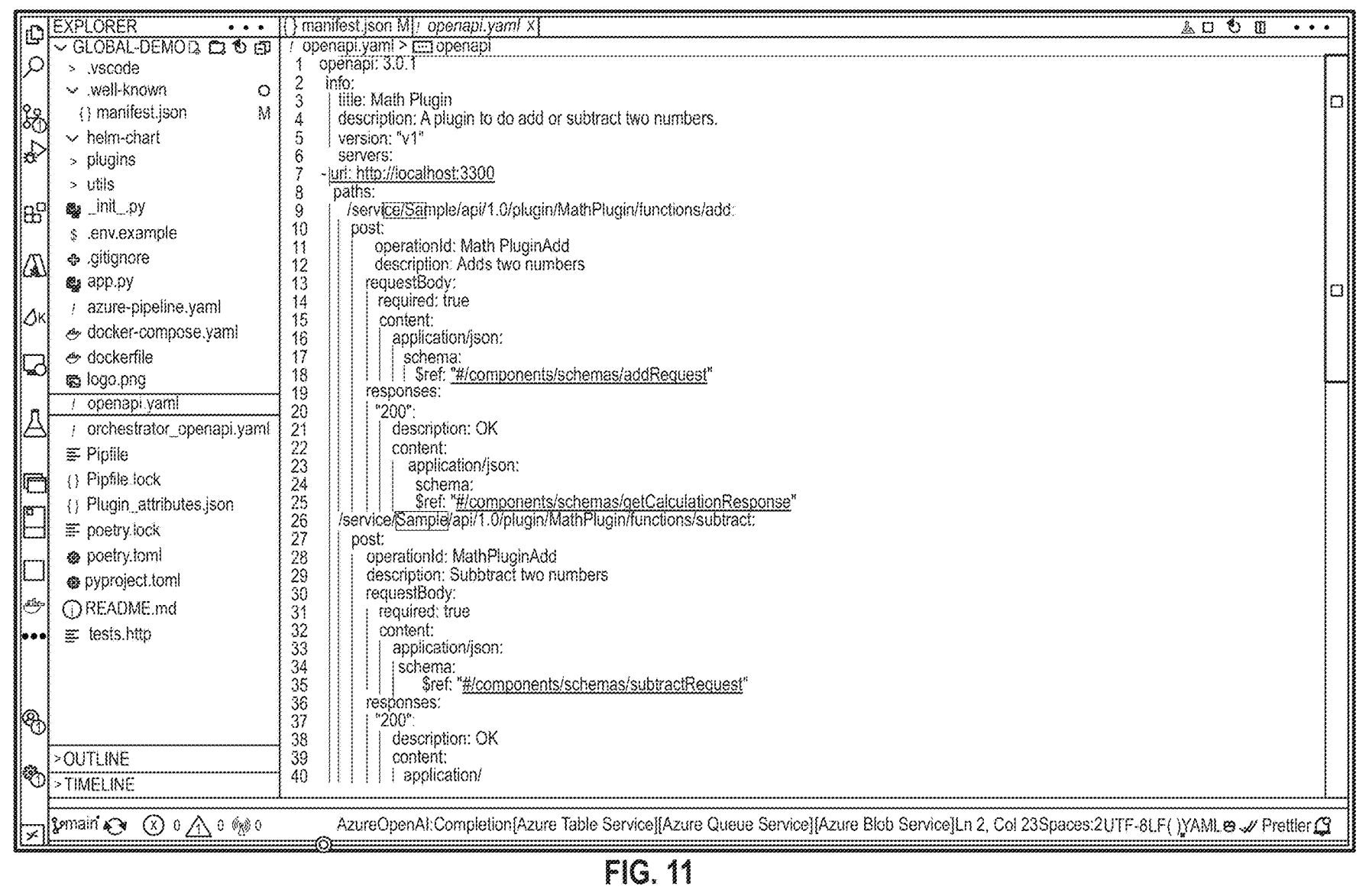
Figure 12:
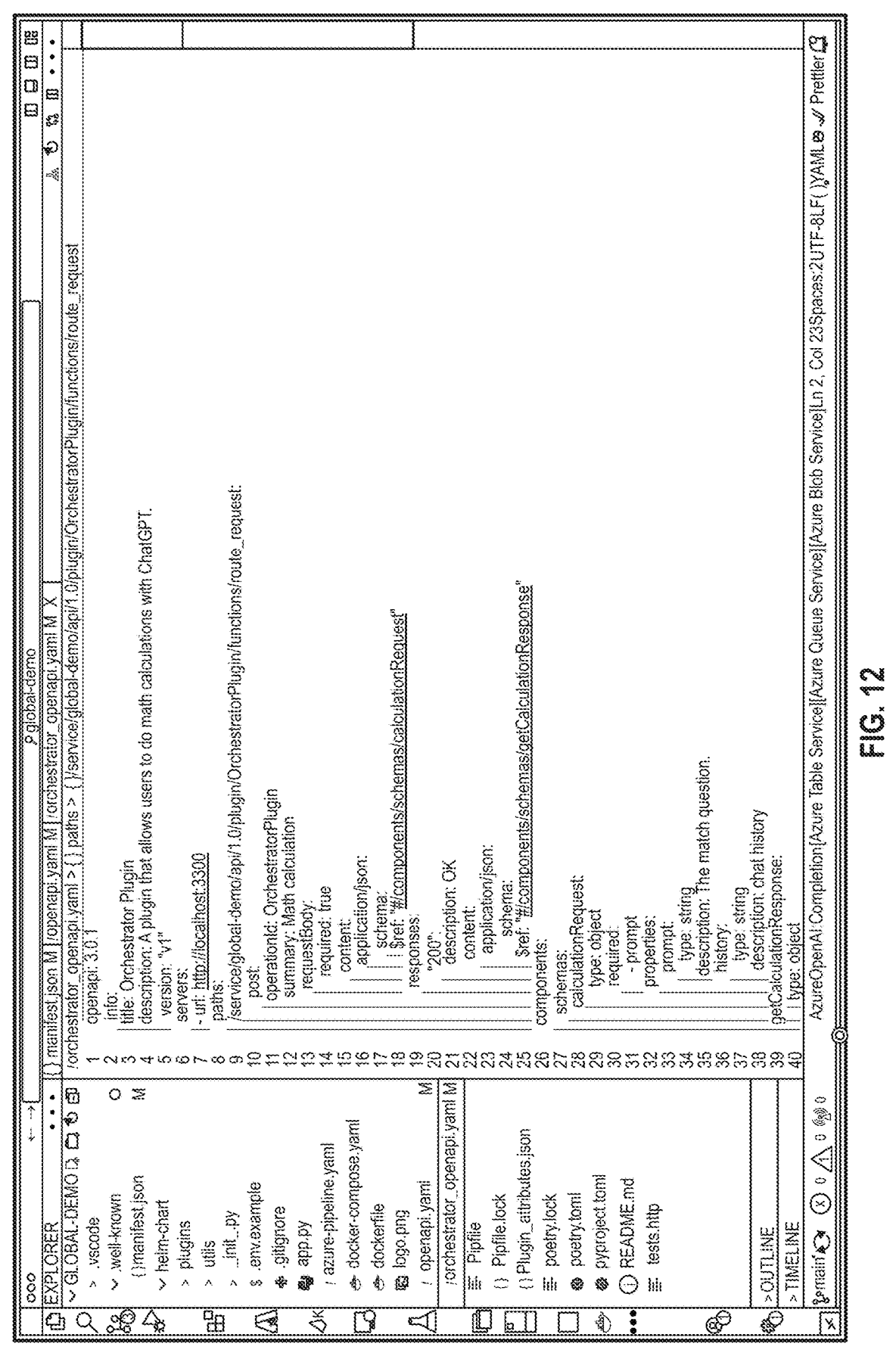

FIG. 10 depicts an exemplary manifest.json file that may form part of the context template according to some examples. The manifest file depicted in FIG. 10 includes a plurality of metadata fields for defining plugin context, including an identifier, version, description, and API, among other aspects, as shown. FIG. 11 depicts an exemplary openapi.yaml file. The aspect of the code template depicted in FIG. 11 defines API endpoints, their operations, and parameters associated with the plugin. For instance, the exemplary file of FIG. 11 includes paths/endpoints to an addition and subtraction capability associated with the plugin. FIG. 12 depicts an exemplary orchestrator_openapi.yaml file that defines API endpoints for performing math calculations using CHATGPT.

Figure 13:
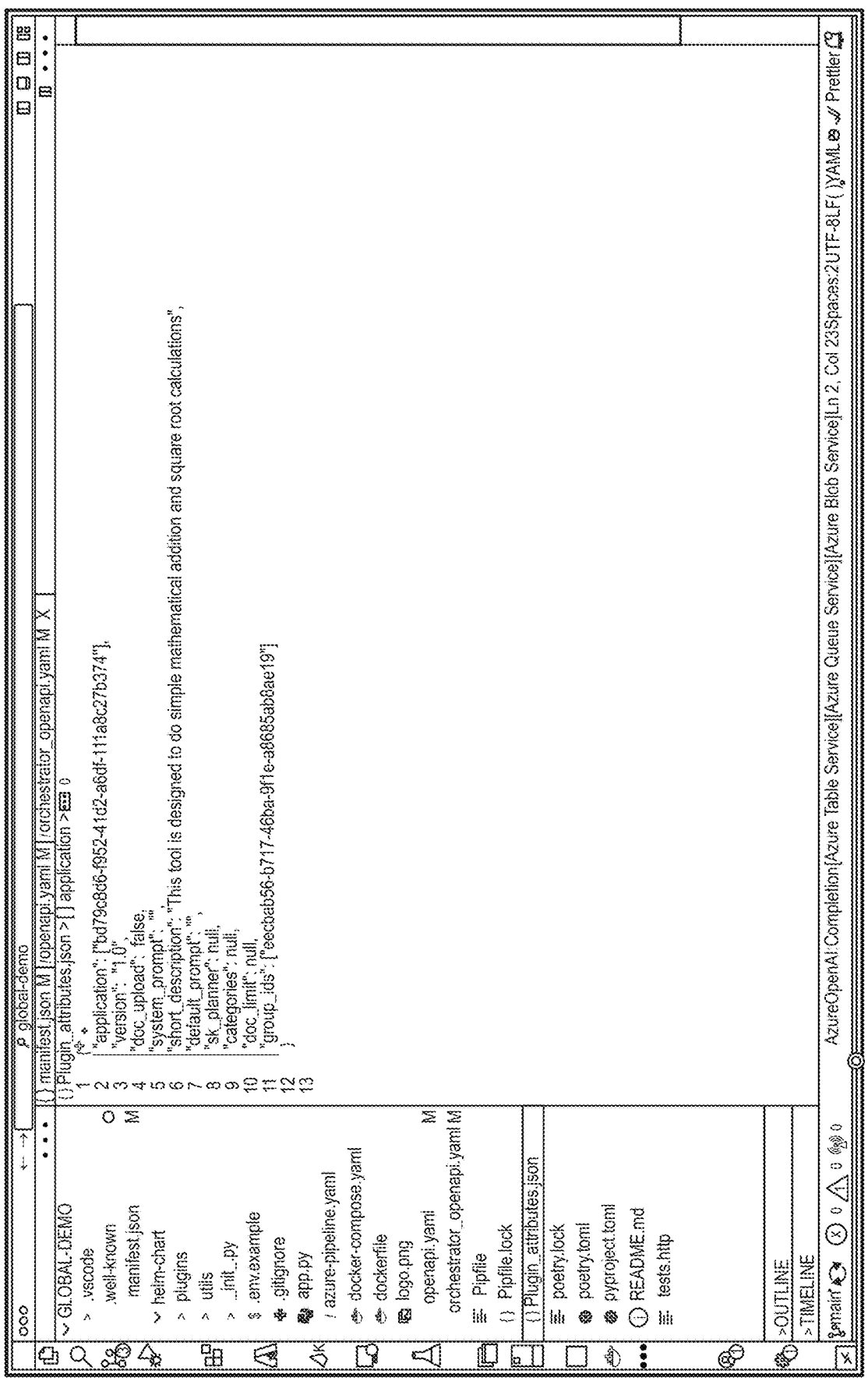
FIG. 13 illustrates an exemplary plugin_attributes.json file of a code template, according to some examples.

FIG. 13 depicts an exemplary plugin attributes file of the exemplary code template. The exemplary plugin attributes file shown includes an application identifier field for including an application identifier to which the plugin is configured to be connected, a version field for defining a plugin version, a document upload capability field for defining a plugin capability to accept document uploads, a system prompt field, a short description field for providing a semantic description of plugin functionality, a default prompt field, a planner field for defining a function planner, and a document upload limit field, among other fields.

Figure 15:
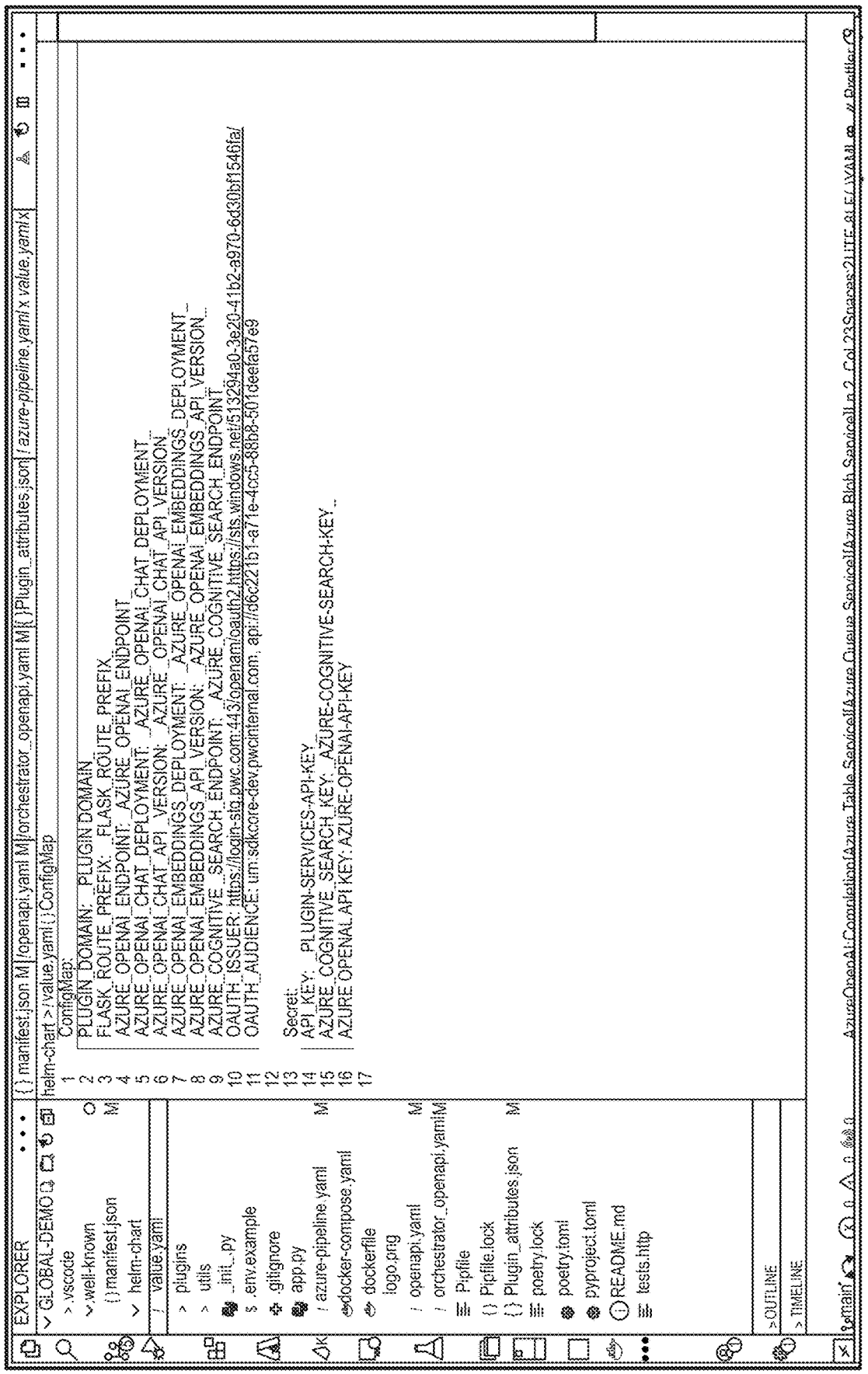
FIG. 15 illustrates an exemplary value.yaml file of a code template, according to some examples.
Figure 16:
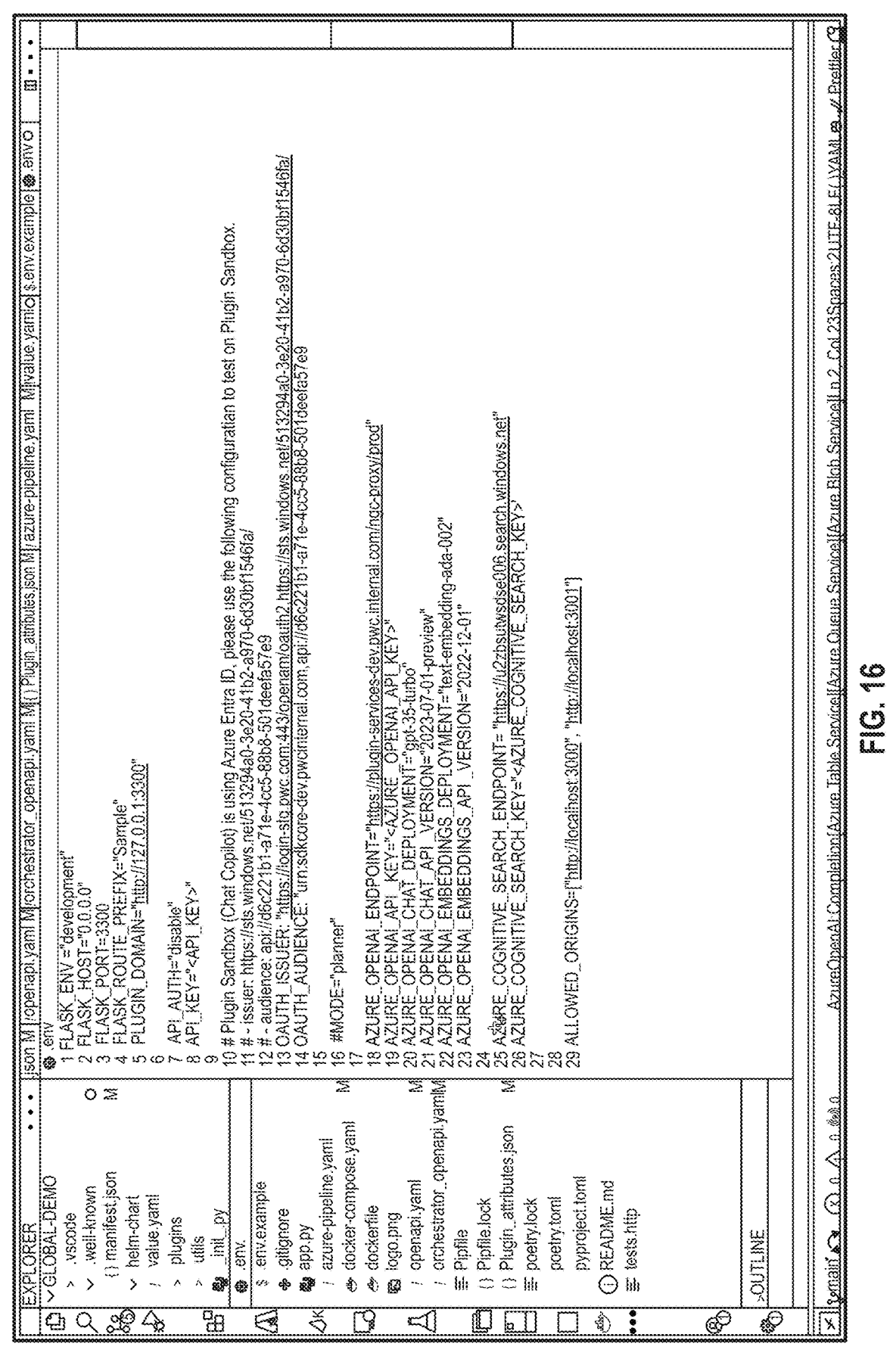
Figure 18:
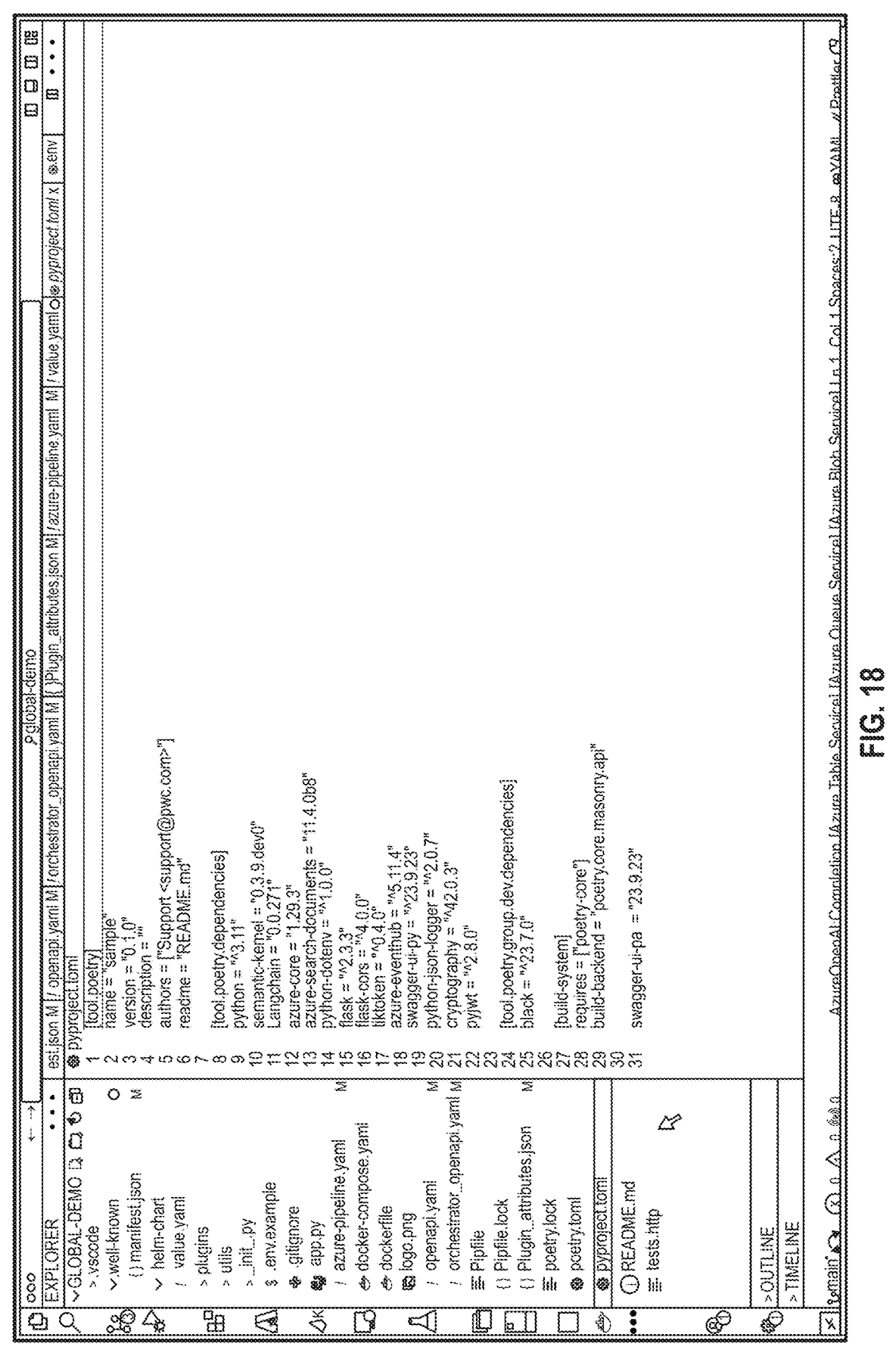
Figure 19:
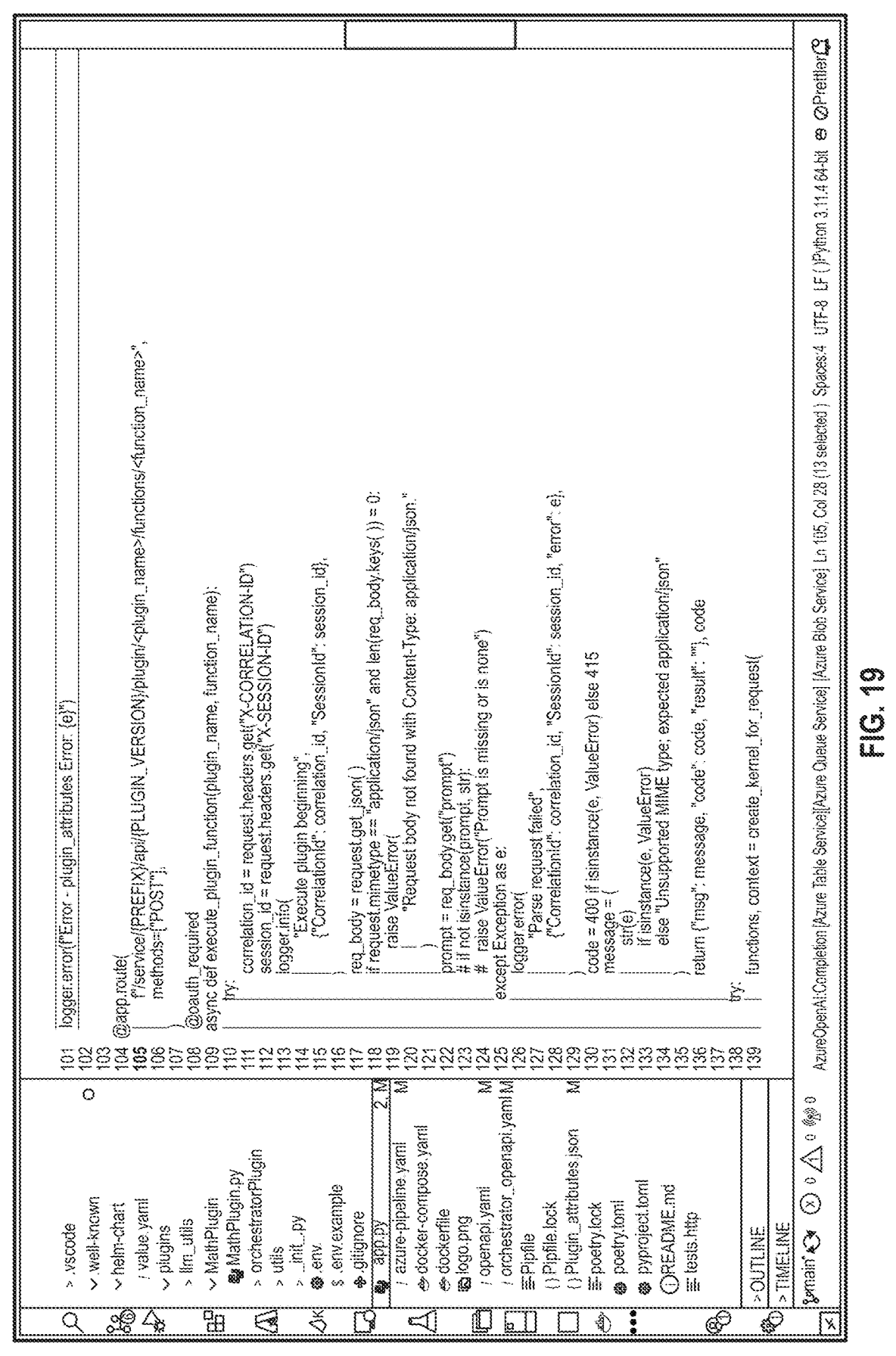
Figure 20:
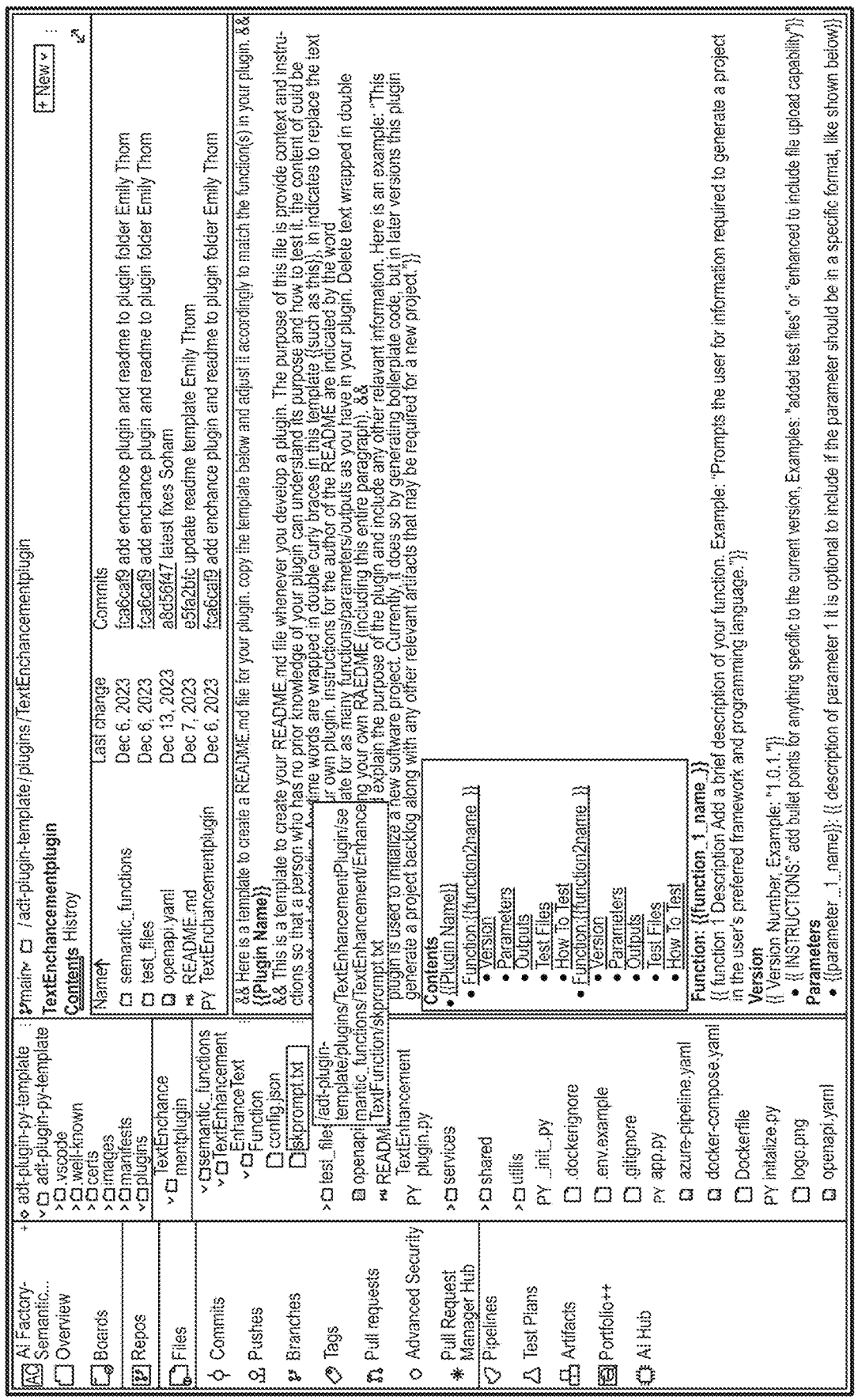
FIG. 20 illustrates an exemplary plugin folder including semantic functions of a code template, according to some examples.
Figure 21:
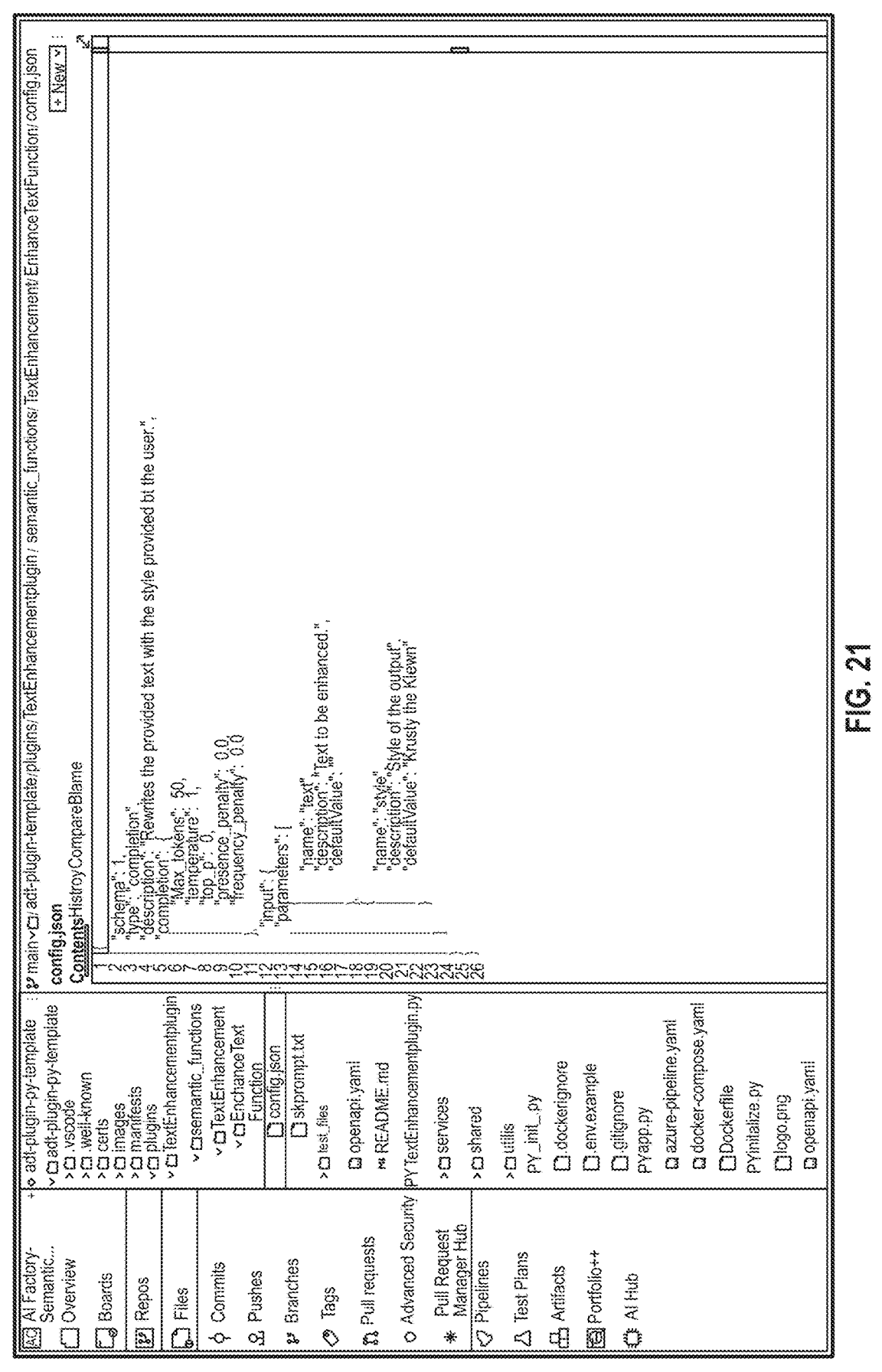
Figure 22:
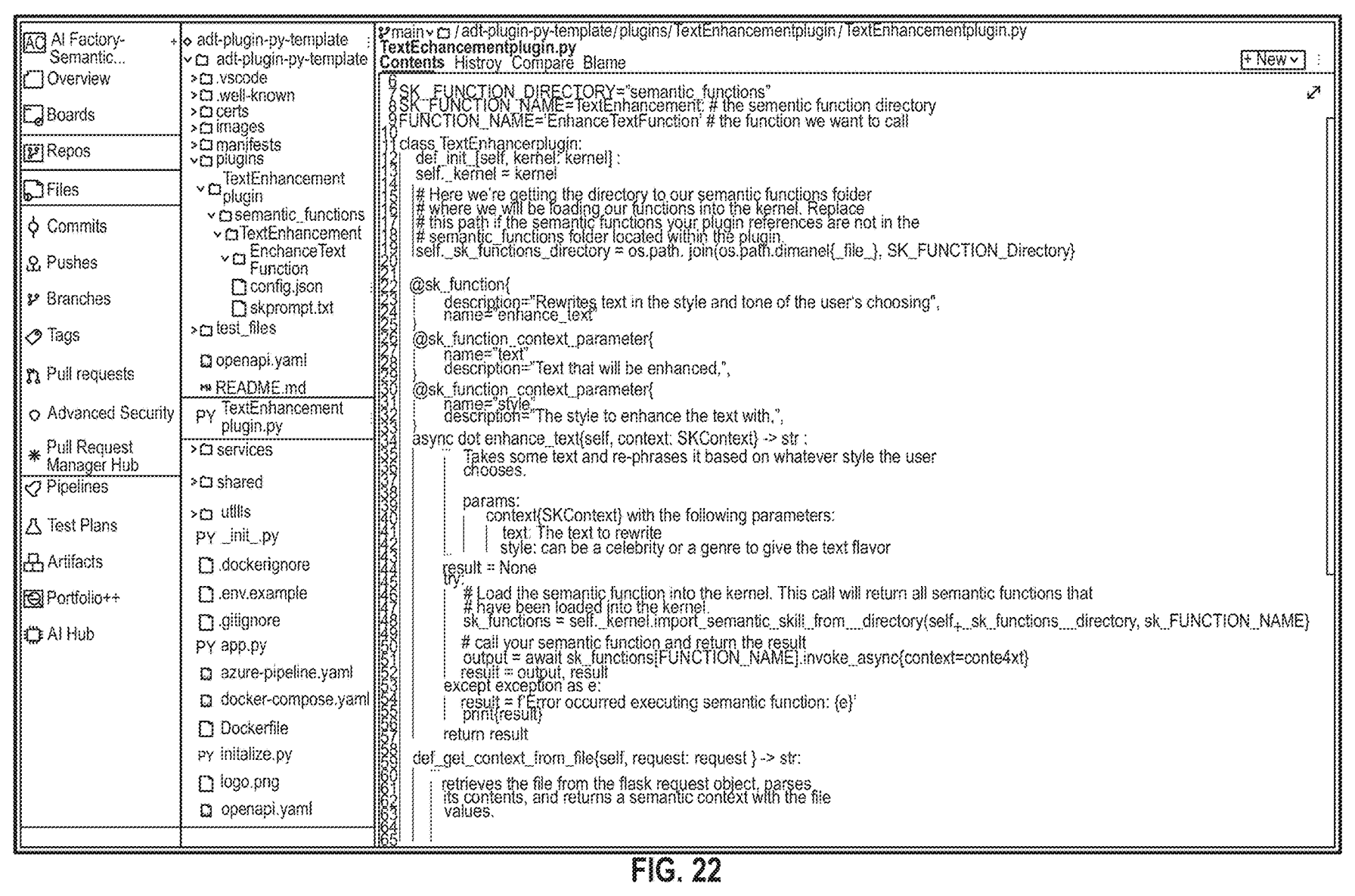

FIG. 14 depicts an exemplary AZURE_pipeline.yaml file. The exemplary file of FIG. 14 may be a configuration file that defines plugin specific variables and parameters, as depicted. The exemplary file of FIG. 14 may be used for Continuous Integration/Continuous Deployment (CI/CD) pipelines in AZURE DevOps environments. FIG. 15 illustrates an exemplary value.yaml file of the exemplary code template that includes API key fields for the exemplary plugin. FIG. 16 depicts an exemplary.env file of the exemplary code template that includes fields for defining additional API keys, API endpoints, and other variables associated with the plugin. FIG. 17 depicts an exemplary docker file of the exemplary code template for assembling a docker container images associated with the plugin. FIG. 18 illustrates an exemplary pyproject.toml file of the exemplary code template that includes additional configuration fields for the plugin. FIG. 19 depicts an exemplary app.py file of the exemplary code template. The exemplary app.py file is an exemplary entry point file for an application. FIG. 20 illustrates an exemplary text enhancement plugin folder of the exemplary code template. FIG. 21 illustrates an exemplary configuration file (e.g., aspect of a context template) of the plugin folder depicted in FIG. 20 within the code template. FIG. 22 illustrates code for an exemplary text enhancement plugin.

Figure 23:
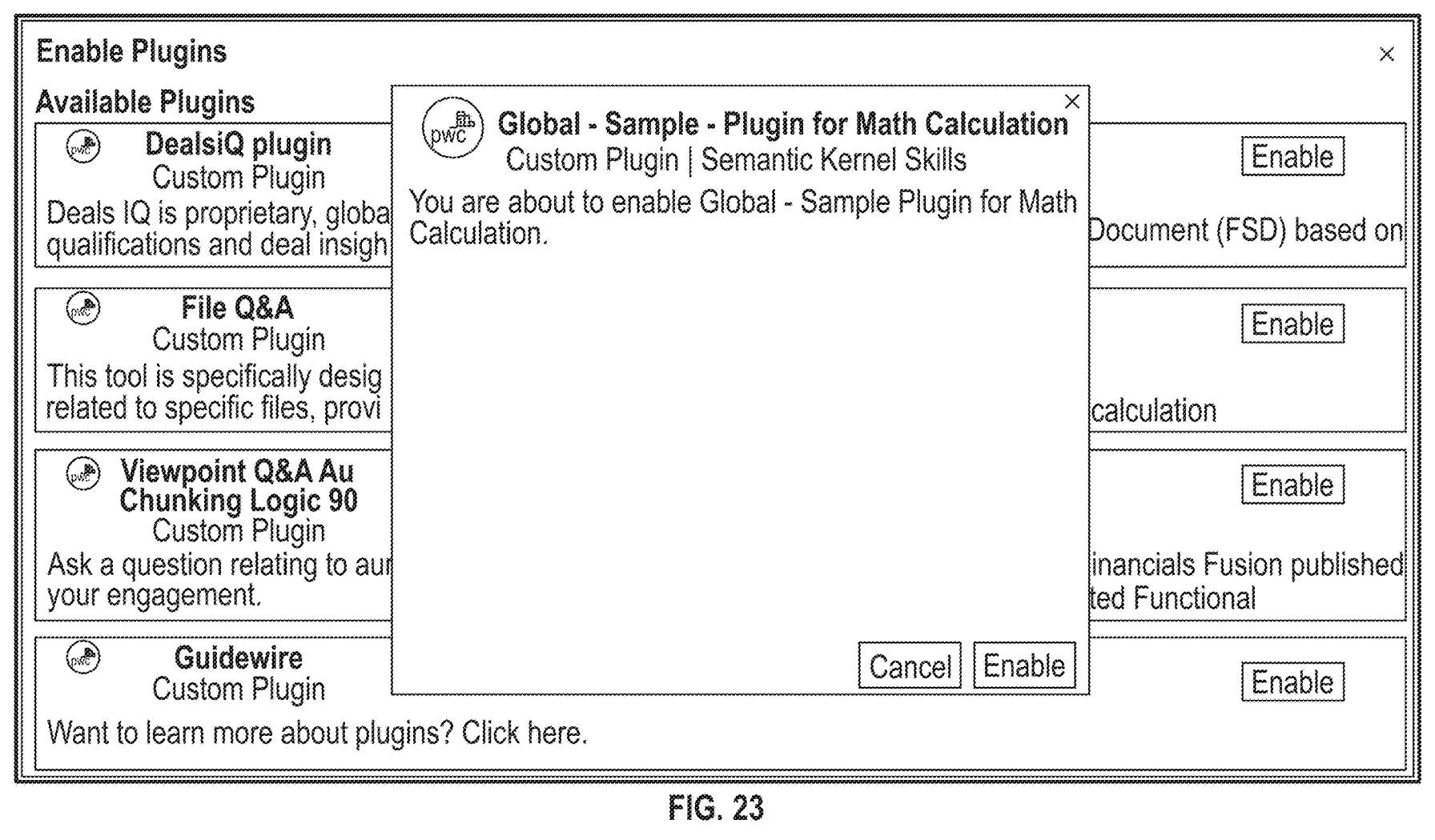

FIG. 23 illustrates an exemplary user interface of an application for enabling plugins. As shown the user interface includes affordances respectively associated with a plurality of plugins. The affordances are labeled "Enable" and when selected may connect a plugin/enable the functionality of the plugin within the application.

Figure 24:
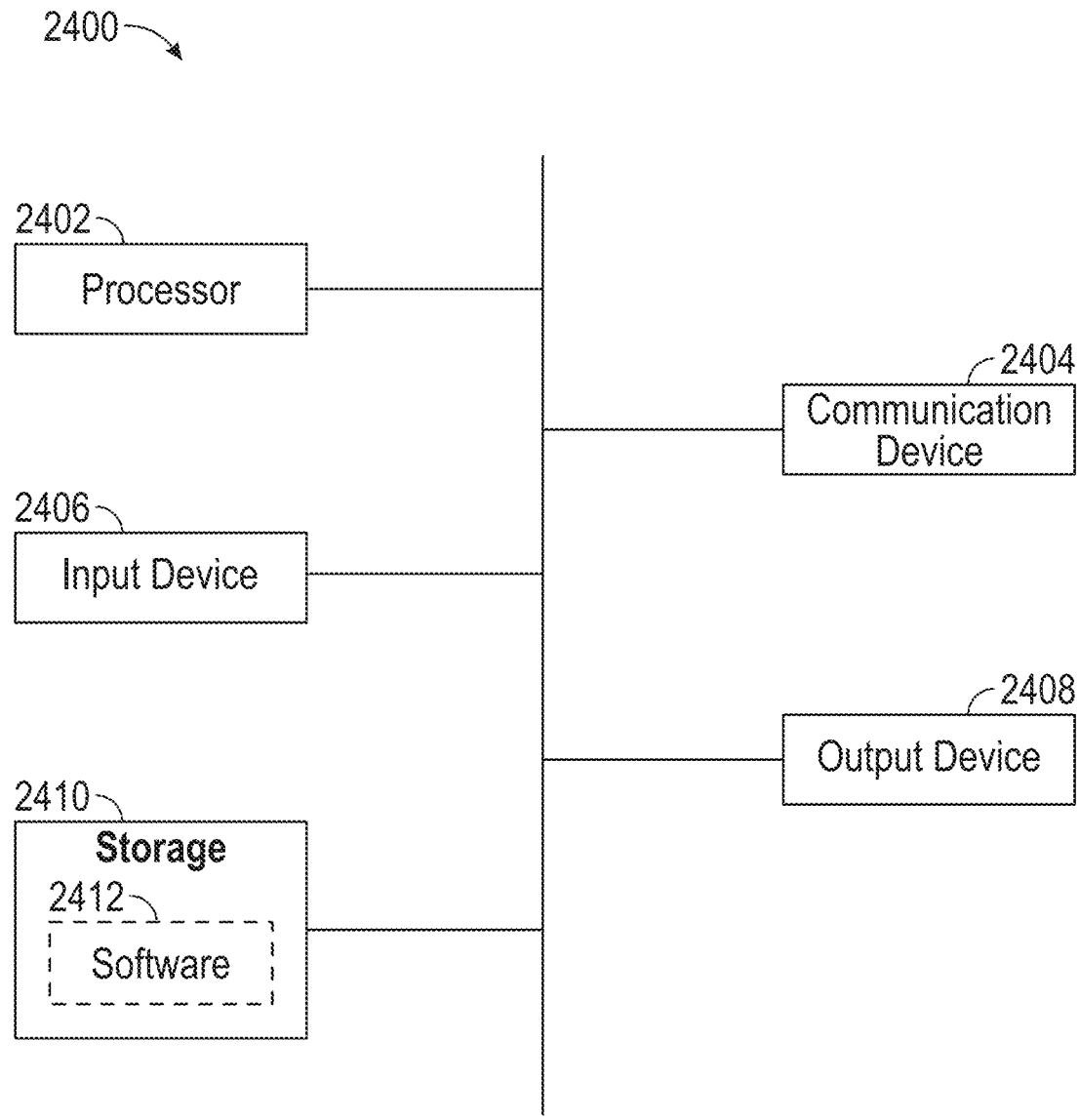
FIG. 24 illustrates an exemplary computing device, according to some examples.

FIG. 24 illustrates an exemplary computing device 2400 that may be used for creating and deploying plugins for use with web-hosted large language model applications, which can be used in accordance with one or more examples of the disclosure. Device 2400 can be a client computer or a server. As shown in FIG. 24, device 2400 can be any suitable type of microprocessor-based device, such as a personal computer, workstation, server, or handheld computing device (portable electronic device) such as a phone or tablet. The device can include, for example, one or more of processors 2402, input device 2406, output device 2408, storage 2410, and communication device 2404. Input device 2406 and output device 2408 can generally correspond to those described above and can either be connectable or integrated with the computer.

Input device 2406 can be any suitable device that provides input, such as a touch screen, keyboard or keypad, mouse, or voice-recognition device. Output device 2408 can be any suitable device that provides output, such as a touch screen, haptics device, or speaker.

Storage 2410 can be any suitable device that provides storage, such as an electrical, magnetic, or optical memory, including a RAM, cache, hard drive, or removable storage disk. Communication device 2404 can include any suitable device capable of transmitting and receiving signals over a network, such as a network interface chip or device. The components of the computer can be connected in any suitable manner, such as via a physical bus or wirelessly.

Software 2412, which can be stored in storage 2410 and executed by processor 2402, can include, for example, the programming that embodies the functionality of the present disclosure (e.g., as embodied in the devices as described above). For example, software 2412 can include software for performing one or more steps of method 200 of FIG. 2.

Software 2412 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 2410, that can contain or store programming for use by or in connection with an instruction execution system, apparatus, or device.

Software 2412 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 2400 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, TI or T3 lines, cable networks, DSL, or telephone lines.

Device 2400 can implement any operating system suitable for operating on the network. Software 2412 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The invention claimed is:

1. A method for connecting a plugin to a large language model (LLM) application, the method comprising:
   at a plugin registry:
      receiving, from the LLM application, a plugin discovery request wherein the request includes an application identifier for identifying one or more plugins comprising computer executable code that when executed enables the one or more plugins to be connected to the LLM application;
      querying a database to identify the one or more plugins comprising computer executable code that when executed enables the one or more plugins to be connected to the LLM application, wherein the querying comprises matching the application identifier to an indication of a compatible LLM application associated with the one or more plugins;
      transmitting, to the LLM application, an indication of the one or more plugins comprising the computer executable code that when executed enables the one or more plugins to be connected to the LLM application in response to the plugin discovery request;
      receiving a selection of at least one plugin of the one or more plugins comprising the computer executable code that when executed enables the one or more plugins to be connected to the LLM application;
      calling the at least one selected plugin using a plugin identifier associated with the at least one selected plugin included in the indication of the one or more plugins; and
      connecting the at least one selected plugin to the LLM application, comprising connecting the LLM application to an application programming interface (API) associated with the at least one selected plugin and automatically enabling cloud-specific functionality and AI-model specific functionality included in the selected plugin;
   at the LLM application:
      receiving a user input via a user interface of the LLM application;
      processing the user input using the at least one selected plugin and the LLM application, wherein processing the user input comprises selecting one or more functions of the at least one selected plugin to execute based on the user input, wherein selecting the one or more functions comprises:
         classifying an intent based on the user input using the LLM application,
         selecting the one or more functions based on the classified intent; and
         executing the one or more functions to generate an output.

2. The method of claim 1, comprising: displaying the output at the user interface of the LLM application.

3. The method of claim 1, wherein the user input comprises at least one of: a natural language input, one or more files, a selection of a user affordance, or any combination thereof.

4. The method of claim 1, wherein the one or more functions, when executed, perform at least one of:
   connecting the at least one selected plugin to any of an external application programming interface (API), a second database, a file, and a different plugin;
   storing at least one of the user inputs received via the LLM application and outputs generated by the LLM application in a memory;
   manipulating data included in the user input; and
   manipulating data obtained from the second database based on the user input.

5. The method of claim 1, wherein the one or more functions are selected based on a comparison between a semantic description of the one or more functions and the user input.

6. The method of claim 1, wherein the one or more functions are selected based on the user input manually using function chaining or automatically using a planner.

7. The method of claim 1, wherein the output comprises any of a natural language output, a structured data output, an image data output, or any combination thereof.

8. The method of claim 1, comprising:
   automatically reconfiguring the user interface of the LLM application to display one or more selectable affordances based on the indication of the one or more plugins; and
   receiving a user selection of an affordance of the one or more selectable affordances.

9. The method of claim 8, comprising: reconfiguring the user interface upon the user selection of the affordance of the one or more selectable affordances to display a user authentication request, the authentication request comprising a prompt for a user credential.

10. The method of claim 1, wherein the indication of the compatible LLM application is stored in a metadata field of the at least one selected plugin.

11. The method of claim 1, wherein the one or more plugins are containerized application programming interfaces (APIs).

12. The method of claim 1, wherein the one or more plugins comprise context, at least one native function, and at least one semantic prompt configured to prompt a large language model.

13. The method of claim 1, wherein connecting the at least one selected plugin to the LLM application comprises authenticating at least one of a user credential, an application credential, and an organization credential.

14. A system for connecting a plugin to an LLM application, the system comprising one or more processors and memory storing one or more computer programs that include computer instructions, which when executed by the one or more processors, cause the system to:
  at a plugin registry:
    receive, from the LLM application, a plugin discovery request wherein the request includes an application identifier for identifying one or more plugins comprising computer executable code that when executed enables the one or more plugins to be connected to the LLM application;
    query a database to identify the one or more plugins comprising computer executable code that when executed enables the one or more plugins to be connected to the LLM, wherein the querying comprises matching the application identifier to an indication of a compatible LLM application associated with the one or more plugins;
    transmit, to the LLM application, an indication of the one or more plugins comprising the computer executable code that when executed enables the one or more plugins to be connected to the LLM application in response to the plugin discovery request;
    receive a selection of at least one plugin of the one or more plugins comprising the computer executable code that when executed enables the one or more plugins to be connected to the LLM application;
    call the at least one selected plugin using a plugin identifier associated with the at least one selected plugin included in the indication of the one or more plugins; and
    connect the at least one selected plugin to the LLM application, comprising connecting the LLM application to an application programming interface (API) associated with the at least one selected plugin and automatically enabling cloud-specific functionality and AI-model specific functionality included in the selected plugin;
  at the LLM application:
    receive a user input via a user interface of the application;
    process the user input using the at least one selected plugin and the LLM application, wherein processing the user input comprises selecting one or more functions of the at least one selected plugin to execute based on the user input, wherein selecting the one or more functions comprises:
      classifying an intent based on the user input using the LLM application,
      selecting the one or more functions based on the classified intent; and executing the one or more functions to generate an output.

15. A non-transitory computer readable storage medium storing instructions for connecting a plugin to an LLM application, the instructions configured to be executed by one or more processors of a computing system to cause the system to:
  at a plugin registry:
    receive, from the LLM application, a plugin discovery request wherein the request includes an application identifier for identifying one or more plugins comprising computer executable code that when executed enables the one or more plugins to be connected to the LLM application;
    query a database to identify the one or more plugins comprising computer executable code that when executed enables the one or more plugins to be connected to the LLM, wherein the querying comprises matching the application identifier to an indication of a compatible LLM application associated with the one or more plugins;
    transmit, to the LLM application, an indication of the one or more plugins comprising the computer executable code that when executed enables the one or more plugins to be connected to the LLM application in response to the plugin discovery request;
    receive a selection of at least one plugin of the one or more plugins comprising the computer executable code that when executed enables the one or more plugins to be connected to the LLM application;
    call the at least one selected plugin using a plugin identifier associated with the at least one selected plugin included in the indication of the one or more plugins; and
    connect the at least one selected plugin to the LLM application, comprising connecting the LLM application to an application programming interface (API) associated with the at least one selected plugin and automatically enabling cloud-specific functionality and AI-model specific functionality included in the selected plugin;
  at the LLM application:
    receive a user input via a user interface of the application;
    process the user input using the at least one selected plugin and the LLM application, wherein processing the user input comprises selecting one or more functions of the at least one selected plugin to execute based on the user input, wherein selecting the one or more functions comprises:
      classifying an intent based on the user input using the LLM application,
      selecting the one or more functions based on the classified intent; and executing the one or more functions to generate an output.

* * * * *